(12) United States Patent
Fine

(10) Patent No.: US 10,692,389 B2
(45) Date of Patent: Jun. 23, 2020

(54) FLIGHT CONTROL SYSTEMS FOR AERIAL VEHICLES AND RELATED METHODS

(71) Applicant: Aurora Flight Sciences Corporation, Manassas, VA (US)

(72) Inventor: Jason Solomon Fine, Aldie, VA (US)

(73) Assignee: Aurora Flight Services Corporation, a subsidiary of The Boeing Company, Manassas, VA (US)

( * ) Notice: Subject to any disclaimer, the term of this patent is extended or adjusted under 35 U.S.C. 154(b) by 0 days.

(21) Appl. No.: 16/041,597

(22) Filed: Jul. 20, 2018

(65) Prior Publication Data
US 2020/0027358 A1   Jan. 23, 2020

(51) Int. Cl.
*G08G 5/00* (2006.01)
*B64C 39/02* (2006.01)
(Continued)

(52) U.S. Cl.
CPC ........... *G08G 5/0069* (2013.01); *B64C 39/02* (2013.01); *G01S 13/933* (2020.01); *G08G 5/045* (2013.01);
(Continued)

(58) Field of Classification Search
USPC .......................................................... 701/24
See application file for complete search history.

(56) References Cited

U.S. PATENT DOCUMENTS

| 8,380,425 B2 * | 2/2013 | Duggan | ............... | G08G 5/0069 244/175 |
| 9,087,451 B1 * | 7/2015 | Jarrell | ................... | G08G 5/0069 |

(Continued)

FOREIGN PATENT DOCUMENTS

WO   WO2016/154942   10/2016

OTHER PUBLICATIONS

Department of Transportation, Federal Aviation Administration, Final Rule RIN 2120-AJ60, Operation and Certification of Small Unmanned Aircraft Systems, Jun. 21, 2016.
(Continued)

*Primary Examiner* — Tyler D Paige
(74) *Attorney, Agent, or Firm* — DASCENZO Intellectual Property Law, P.C.

(57) ABSTRACT

Methods and systems may allow for automatic initiation of a contingency maneuver, to prevent mid-air collisions between an aerial vehicle and another aircraft or other obstacle, without requiring input from an operator. Generally, a processing unit on board the aerial vehicle detects potential conflicts via a navigation system on board the aerial vehicle. Said navigation system may receive, for example, automatic dependent surveillance-broadcast (ADS-B) signals and global positioning system (GPS) data. Disclosed systems automatically initiate one or more contingency maneuvers to change the flight (e.g., speed, position, direction, and/or altitude) of the aerial vehicle to avoid close calls or colliding with a potential conflict in the surrounding airspace. Such contingency maneuvers provide an automatic flight modification that may occur independently from any operator input. Such systems may also be implemented to prevent an aerial vehicle from entering a restricted airspace and/or from operating too close to another aircraft.

20 Claims, 7 Drawing Sheets

(51) Int. Cl.
*G01S 13/933* (2020.01)
*G05D 1/10* (2006.01)
*G08G 5/04* (2006.01)
*B64C 19/00* (2006.01)
*B64D 47/08* (2006.01)
*G05D 1/00* (2006.01)
*G05D 1/02* (2020.01)
*G05D 1/04* (2006.01)
*G05D 1/08* (2006.01)

(52) U.S. Cl.
CPC ........ *B64C 19/00* (2013.01); *B64C 2201/145* (2013.01); *B64D 47/08* (2013.01); *G05D 1/0088* (2013.01); *G05D 1/0202* (2013.01); *G05D 1/042* (2013.01); *G05D 1/0808* (2013.01); *G05D 1/101* (2013.01)

(56) References Cited

U.S. PATENT DOCUMENTS

| | | | |
|---|---|---|---|
| 9,359,074 B2* | 6/2016 | Ganesh | G08G 5/0069 |
| 9,405,005 B1 | 8/2016 | Arteaga | |
| 9,588,516 B1 | 3/2017 | Gurel et al. | |
| 2002/0176605 A1* | 11/2002 | Stafsudd | G06K 9/3241 |
| | | | 382/106 |
| 2010/0332136 A1* | 12/2010 | Duggan | G08G 5/0069 |
| | | | 701/301 |
| 2011/0264309 A1* | 10/2011 | Molander | G01S 11/12 |
| | | | 701/11 |
| 2014/0303884 A1* | 10/2014 | Levien | G08G 5/04 |
| | | | 701/301 |
| 2016/0069994 A1* | 3/2016 | Allen | G01S 13/9303 |
| | | | 342/29 |
| 2017/0039860 A1* | 2/2017 | Just | H01Q 21/28 |
| 2017/0069214 A1* | 3/2017 | Dupray | G08G 5/0021 |
| 2017/0176575 A1* | 6/2017 | Smits | G01S 17/003 |

OTHER PUBLICATIONS

European Patent Office, Extended European Search Report for related European Patent Application No. 19186804, dated Dec. 16, 2019.

* cited by examiner

FLIGHT CONTROL SYSTEMS FOR AERIAL VEHICLES AND RELATED METHODS

FIELD

The present disclosure relates to flight control systems for aerial vehicles, such as flight termination systems for aerial vehicles, and related methods.

BACKGROUND

With the use of unmanned aircraft (e.g., drones) becoming more widespread, the risks of mid-air collisions between unmanned aircraft, or between an unmanned aircraft and a manned aircraft, must be mitigated. Existing flight termination systems for unmanned aircraft may operate to terminate flight of an unmanned vehicle to avoid mid-air collisions, but require activation by a human operator from the ground, and thus are prone to error. For example, existing flight termination systems may detect a potential conflict (e.g., a future collision if both aircraft remained on their current course) and provide recommended avoidance maneuvers to the remote operator, but if the operator fails to take adequate action, then the mid-air collision may still occur. In current systems including situational awareness displays, the operator must recognize impending conflict (which is again prone to error) and mitigate it via a ground control link. If a functional data link between the operator and the aircraft is absent, then the operator would be unable to successfully prevent the collision. Additionally, such systems and associated sensors may be expensive, and/or too large or heavy to be included on smaller aircraft.

SUMMARY

Presently disclosed methods and systems may allow for automatic initiation of a contingency maneuver, to prevent mid-air collisions between an aerial vehicle and another aircraft or other obstacle, without requiring input from an operator. Generally, a processing unit on board the aircraft detects potential conflicts and determines whether a deviating condition exists via a navigation system on board the aircraft, which may include, for example, an automatic dependent surveillance-broadcast (ADS-B) receiver and/or a global positioning system (GPS) receiver. When a deviating condition is detected, the processing unit automatically initiates a contingency maneuver to change the flight of the aircraft to avoid colliding with a second aircraft in the surrounding airspace. Such systems may also be implemented to prevent an aerial vehicle from entering a restricted airspace and/or from operating too close to another aircraft.

In one disclosed method of causing an aerial vehicle to perform a contingency maneuver, a processing unit on-board the aerial vehicle identifies a first situational data set of the aerial vehicle by receiving sensor data, such as GPS data, from a sensor (e.g., a GPS receiver), and/or air traffic signals from other aircraft. The processing unit then compares the first situational data set to a second situational data set in view of one or more criteria stored on non-transitory computer readable memory of the aerial vehicle. If such comparing reveals a condition that deviates from desirable (e.g., a deviating condition), the processing unit automatically (e.g., without input from an operator) triggers activation of a contingency maneuver that mitigates the deviating condition. The aerial vehicle may be autonomous, or controlled by user command signals generated by a remotely positioned ground control station operated by an operator positioned remotely from the aerial vehicle. The navigation system of the aerial vehicle may include an automatic dependent surveillance-broadcast messaging receiver configured to receive automatic dependent surveillance-broadcast signals (ADS-B In messages), which the processing unit may use to identify the second situational data set.

For example, the processing unit may determine the first situational data set (which may include a speed, altitude, and/or direction of travel of the aerial vehicle) based on GPS or other sensor data, and may determine the second situational data set (which may include a speed, altitude, and/or direction of travel of a nearby aircraft) based on air traffic signals received from the nearby aircraft. The contingency maneuver may be triggered, if, for example, comparing the first and second situational data sets reveals that the two aircraft are on course to come within a predetermined threshold distance from each other. The contingency maneuver interrupts the flight of the aerial vehicle, such that its speed, altitude, direction, and/or position is altered enough to avoid the nearby aircraft, thereby mitigating the deviating condition. In another example, the second situational data set may include a predetermined set of data stored on the memory on board the aerial vehicle, such as a maximum absolute altitude of the aerial vehicle. If the processing unit detects that the aerial vehicle is at a higher altitude than allowed by the stored criteria, the contingency maneuver may be automatically triggered, which may, for example, reduce or terminate power to the aerial vehicle, thereby causing it to lose altitude, until the deviating condition is mitigated (e.g., until the aerial vehicle is below the maximum absolute altitude).

Systems according to the present disclosure may include an aerial vehicle, a navigation system including a sensor on board the aerial vehicle, wherein the navigation system is configured to receive air traffic signals, a memory storing non-transitory computer readable instructions, and at least one processing unit positioned on board the aerial vehicle. The sensor is configured to measure, record, and/or receive sensor data while the aerial vehicle is in flight, such as the current speed, altitude, and/or position of the aerial vehicle. The at least one processing unit is configured to receive the sensor data from the sensor and identify a first situational data set of the aerial vehicle based on the sensor data. For example, the first situational data set may be a situational awareness of the aerial vehicle. The instructions, when executed by the at least one processing unit, cause the at least one processing unit to compare the first situational data set to a second situational data set and cause activation of a contingency maneuver when the at least one processing unit detects a deviating condition as a result of comparing the first situational data set to the second situational data set. Criteria for the deviating condition may be stored on the memory, wherein the contingency maneuver mitigates the deviating condition without external input, and wherein the instructions cause the at least one processing unit to automatically trigger the contingency maneuver in response to detecting the deviating condition. Aerial vehicles, processing units, and computer readable medium are also disclosed.

DESCRIPTION

Presently disclosed methods and systems are configured for automatic initiation of a contingency maneuver, to prevent mid-air collisions between an aerial vehicle and another aircraft or other object or obstacle, without requiring input from an operator. Such systems and methods may provide a lightweight, relatively inexpensive solution that is suitable for, for example, aerial vehicles (e.g., unmanned aerial vehicles, or UAVs). Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
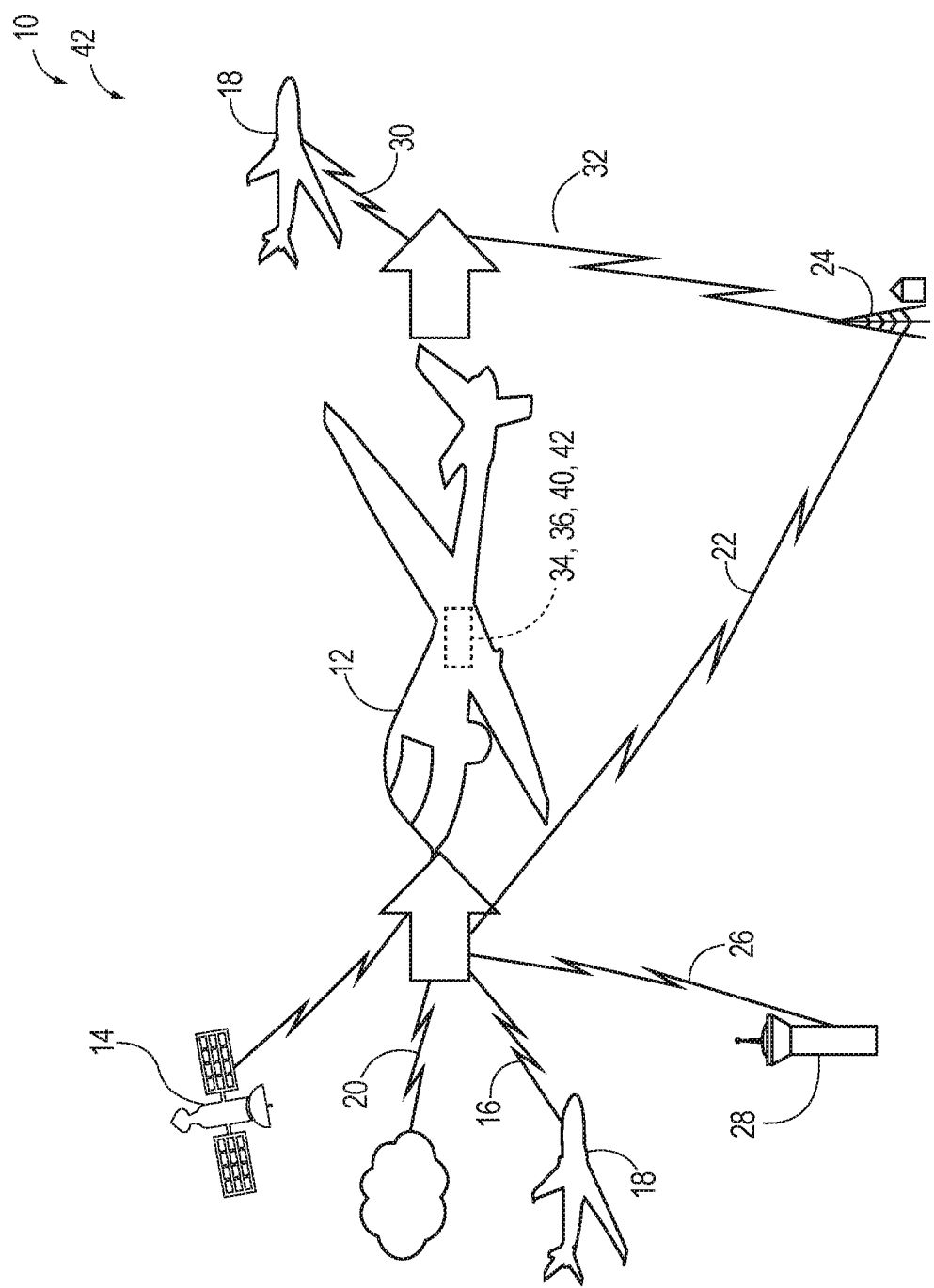
FIG. 1 is a schematic representation of aerial environments according to the present disclosure.

FIG. 1 schematically illustrates aerial environments 10 according to the present disclosure. As shown in FIG. 1, an aerial vehicle 12 is outfitted (e.g., via a system 42) to receive communications, signals, data, and/or other information from one or more sources, and may be configured to transmit communications, signals, data, and/or other information to one or more sources. For example, system 42 may include sensors and/or receivers on board aerial vehicle 12 that are configured to receive signals from aerial environment 10, which may include satellites 14, automatic dependent surveillance-broadcast (ADS-B) messages 16 (e.g., ADS-B In messages) and/or other air traffic signals from other aircraft 18, weather information 20 (which may be sensed by on-board sensors, or delivered wirelessly), user command signals 22 from operators positioned at a ground control station 24, and/or traffic information 26, such as from an air traffic control station 28. In some examples, ground control station 24 may be configured to transmit the positions of aerial vehicle 12 to air traffic control station 28, and/or to a plurality of different air traffic control stations 28, as aerial vehicle 12 moves within range of said stations.

Figure 2:
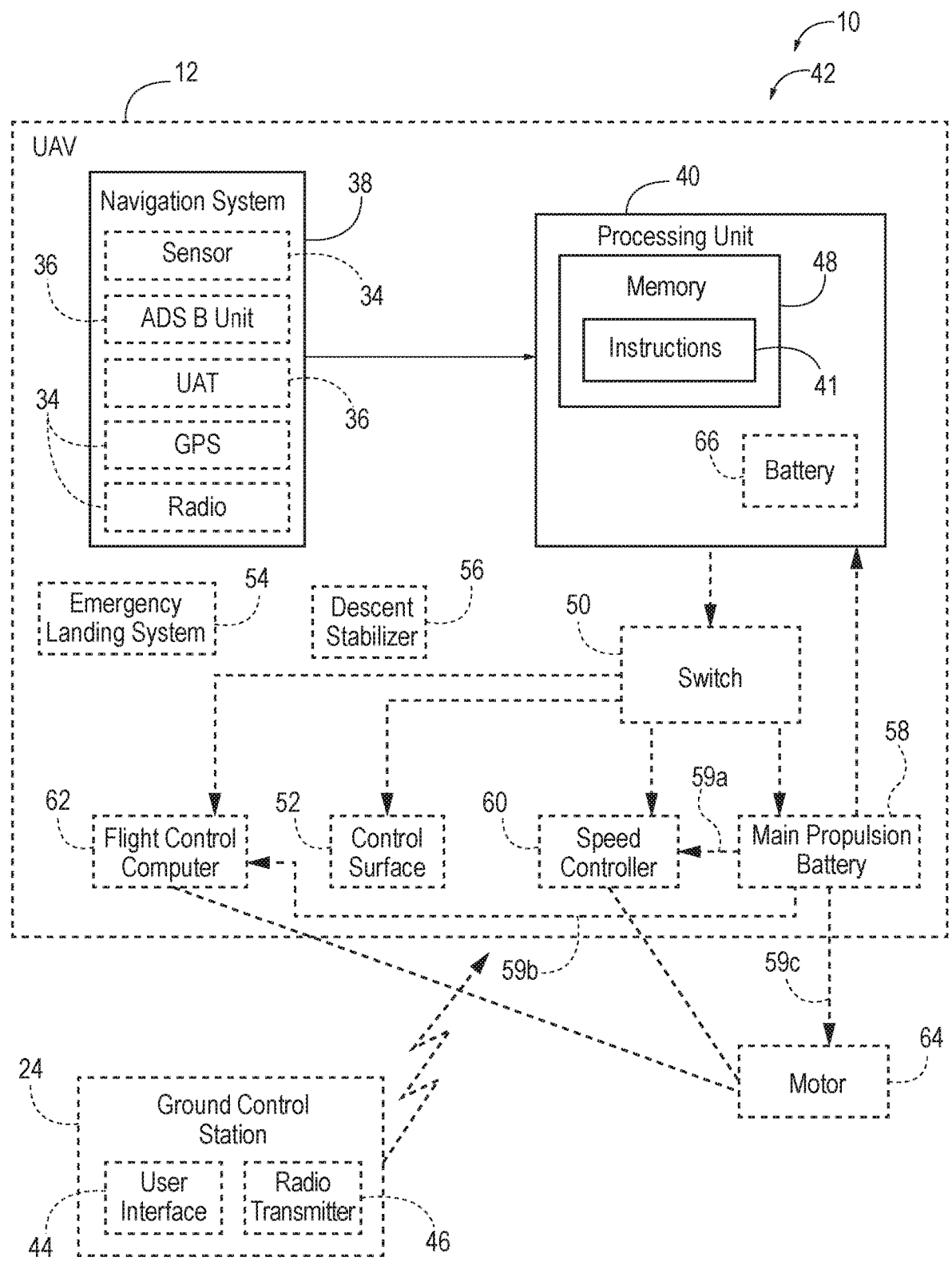
FIG. 2 is a schematic representation of systems for causing an aerial vehicle to perform a contingency maneuver according to the present disclosure.

Aerial vehicle 12 may be equipped to receive data regarding its current location (e.g., ownship data) from Global Navigation Satellite System (GNSS) satellites, such as via GPS, GLONASS, Galileo, BeiDou, and/or other satellite navigation systems, from an inertial navigation system (INS), and/or from another positioning system. In some examples, aerial vehicle 12 may be configured to transmit ADS-B Out messages 30 to other aircraft 18, and/or transmit signals 32 to an operator at a ground control station 24. For example, aerial vehicle 12 may be configured to broadcast its position and/or other data (e.g., bearing, distance from an object, and/or altitude) to any other aircraft or ground stations equipped to receive the signal. To receive and/or transmit such air traffic position information and aircraft ownship position data, system 42 of aerial vehicle 12 generally includes one or more sensors 34 (e.g., a GPS receiver) and/or one or more ADS-B units 36 (e.g., an ADS-B receiver, an ADS-B transmitter, and/or an ASD-B transceiver, such as a universal access transceiver (UAT)). With reference to FIG. 2, sensor 34 and ADS-B unit 36 may be part of a navigation system 38. While navigation system 38 is herein described as generally including at least one ADS-B unit 36, in some examples, navigation system 38 may include one or more other types of receivers for detecting other air traffic in the vicinity of aerial vehicle 12, in addition to or instead of ADS-B unit 36. For example, navigation system 38 may include a traffic collision avoidance system (TCAS), a flight alarm system (FLARM), and/or other similar active traffic systems installed on aerial vehicle 12 that interrogate other aircraft having non-ADS-B transponders, such that system 42 can determine their bearing, distance from aerial vehicle 12, and/or altitude. While systems 42 are generally described as including ADS-B unit 36, it is to be understood that ADS-B unit 36 may be any suitable unit (e.g., receiver, transmitter, and/or transceiver) that is configured to receive air traffic signals from other aircraft near aerial vehicle 12, and thus may include an ADS-B receiver and/or may be a different type of unit. As used herein, "air traffic signals" include any signals received from other aircraft that include position, bearing, distance, speed, and/or altitude information regarding the other aircraft.

Generally, system 42 includes a processing unit 40 on-board aerial vehicle 12, where, in operation, processing unit 40 executes computer-readable instructions 41 (stored on a memory 48 of processing unit 40) to monitor and evaluate information and signals received from aerial environment 10 in order to detect any deviating conditions, in which case processing unit 40 may automatically trigger a contingency maneuver, which may result in a change in speed, a change in direction, and/or a change in altitude of aerial vehicle 12, in order to mitigate and/or remove the deviating condition, as will be described in further detail herein. Accordingly, system 42 may serve as an automatic flight termination system, and/or collision avoidance system.

With reference to FIGS. 1 and 2, aerial vehicle 12 may be configured such that such contingency maneuvers are triggered (e.g., initiated) automatically, without input from an operator at ground control station 24. In some examples, aerial vehicle 12 may be configured such that an operator at ground control station 24 can activate such a contingency maneuver manually. For example, the operator may send user command signals via a user interface 44 (FIG. 2) and/or a radio transmitter 46 (FIG. 2), to control the flight of aerial vehicle 12, with aerial vehicle 12 being configured to receive such user command signals from ground control station 24. However, systems 42 according to the present disclosure are generally configured to override (e.g., interrupt, disconnect, attenuate, and/or take precedence over) user command signals, in the event that processing unit 40 detects a deviating condition. As used herein, a flight path is said to be "interrupted" if the flight path is modified (e.g., if the position, speed, direction, heading, and/or altitude of the vehicle is changed), if flight is terminated, if control of the flight path is overridden by system 42 (e.g., controlled by system 42 instead of by an operator or by an autonomous flight program), and/or if power to one or more flight control components of the vehicle is terminated or modified. Similarly, a signal is said to be "interrupted" if it is modified, attenuated, blocked, reduced in power, amplitude, frequency, and/or duration, and/or terminated.

As used herein, a "deviating condition" is any condition that is outside of desirable, and/or departing from, predetermined criteria for flight of aerial vehicle 12. For example, deviating conditions may include a condition where aerial vehicle 12 is at an altitude that is higher than a predetermined maximum altitude (and/or at a height above ground that is higher than a predetermined maximum height), and/or a condition where an aerial vehicle 12 is less than a predetermined distance away from a potential conflict. Criteria may be selectively alterable or scalable, in some examples. For example, the criteria for a deviating condition of aerial vehicle being higher than a maximum absolute altitude may be set to a lower absolute altitude in certain locations (e.g., within a predetermined radius of an airport) than in other areas. In some examples, the criteria may be selectively scaled, such as in response to a current speed of aerial vehicle 12, or in proportion to a distance between aerial vehicle 12 and a potential conflict (with the criteria being scaled as a result of both distance and closing speed, in some examples). As used herein, a "potential conflict" may include any object within the airspace surrounding aerial vehicle 12 that aerial vehicle 12 may collide with in-air. Whether an object is treated as a potential conflict may be determined by processing unit 40, in some examples, based on, for example, size, speed, and/or location of the object relative to aerial vehicle 12. Potential conflicts may include any objects, buildings, structures, other aircraft (manned or unmanned, with or without communication and/or navigation systems), parachutists, paragliders, skydivers, balloons, and/or animals, and may be stationary or in motion. The deviating condition is said to be 'mitigated' when the deviating condition is removed. For example, a deviating condition of aerial vehicle 12 being higher than a predetermined maximum altitude is mitigated when aerial vehicle 12 descends to an altitude below the predetermined maximum altitude. The deviating condition of aerial vehicle 12 being too close to a potential conflict is mitigated when the flight path of aerial vehicle 12 is altered such that it maintains a minimum distance away from the potential conflict.

Aerial vehicle 12 is typically an unmanned aerial vehicle (UAV), but disclosed systems and processing units may be incorporated into manned aircraft as well. In some examples, aerial vehicle 12 may be autonomous, and/or may have an autonomous flight mode. Additionally or alternatively, aerial vehicle 12 may be controlled by an operator positioned at ground control station 24 (e.g., by user command signals generated by ground control station 24, which is operated by an operator, both of which are positioned remotely from aerial vehicle 12). Aerial vehicle 12 may be, for example, a hobby drone, a professional drone, an aerial photography aircraft, a multicopter (also referred to as a multi-rotor aerial vehicle), a fixed-wing aerial vehicle, a single-rotor (also referred to as a helicopter) aerial vehicle, and/or a fixed-wing hybrid aerial vehicle.

As shown in FIG. 2, system 42 of aerial vehicle 12 generally includes navigation system 38 and at least one processing unit 40. Navigation system 38 generally includes at least one sensor 34 on board aerial vehicle 12, with each sensor 34 being configured to record, detect, measure, monitor, and/or receive positional information of aerial vehicle 12. For example, sensor 34 may include a GPS receiver (or other satellite navigation receiver) to receive information regarding the current position of aerial vehicle 12, a GPS transmitter, and/or a GPS transceiver. Additionally or alternatively, sensor 34 may include one or more accelerometers, airspeed indicators, radio transmitters/receivers, radar transmitters/receivers, gyroscopes, magnetometers, distance sensors (e.g., ultrasonic, laser, and/or LIDAR-based sensors), tilt sensors, and/or inertial measurement units. Accordingly, sensor 34 is configured to receive, measure, monitor, record, and/or detect information (e.g., sensor data) regarding aerial vehicle 12 and/or potential conflicts around aerial vehicle 12, which may include an altitude, a speed, a size, a relative location, and/or a direction of travel of aerial vehicle 12 and/or a potential conflict. Sensor 34 is configured to communicate sensor data to processing unit 40, which may in turn be configured (e.g., via instructions 41) to store the sensor data. Aerial vehicle 12 may additionally or alternatively include any number of other sensors, including but not limited to thermometers or other thermal sensors, barometers, altimeters, engine intake flow sensors, current sensors, timers, vision-based sensors (e.g., cameras), infrared sensors, image sensors, chemical sensors, acoustic sensors, time of flight camera sensors, motion detectors, range finders, pressure gauges, and/or any other type of sensor.

Navigation system 38 of disclosed aerial vehicles 12 is also configured to receive air traffic information from other aircraft near aerial vehicle 12, and may include ADS-B unit 36 configured to receive and/or store automatic dependent surveillance-broadcast signals from other aircraft (e.g., ADS-B In messages), and/or configured to broadcast (e.g., transmit) automatic dependent surveillance-broadcast signals to other aircraft (e.g., ADS-B Out messages). ADS-B unit 36 may be, for example, an ADS-B receiver (also referred to herein as an automatic dependent surveillance-broadcast messaging receiver), an ADS-B transmitter, and/or a UAT configured to both receive and transmit ADS-B signals. Generally, external ADS-B units on other aircraft obtain the aircraft's position via its own navigation system, and periodically broadcast that information. ADS-B unit 36 is configured to receive and/or track such broadcast signals from other aircraft, and in some examples, is configured to broadcast ADS-B Out signals based on the position of aerial vehicle 12 as determined by navigation system 38. In some examples, ADS-B unit 36 may be a UAT that is also configured to receive other information, such as air traffic, weather, and other information from ground control station 24 and/or other ground stations, which can enhance the situational awareness as determined by processing unit 40, and/or for an operator of aerial vehicle 12 at ground control station 24.

Navigation system 38 (e.g., ADS-B unit 36) may be configured to communicate such air traffic information (e.g., ADS-B In and/or ADS-B Out messages) with processing unit 40. For example, navigation system 38 (e.g., ADS-B unit 36) may be configured to communicate signals to processing unit 40 concerning a position of any potential conflicts located within a predetermined radius surrounding aerial vehicle 12, a velocity of any such potential conflicts, and/or a direction of travel of any such potential conflicts. In some examples, processing unit 40 is configured to determine the position of aerial vehicle 12 relative to an external ADS-B transmitter or other transmitter positioned on a potential conflict (e.g., another aircraft), based on signals received from the other aircraft. In this manner, processing unit 40 may utilize information from navigation system 38 (e.g., ADS-B unit 36 and sensor 34) to create a virtual situational awareness of aerial vehicle 12 relative to any potential conflicts within a predetermined radius of aerial vehicle 12. Such virtual situational awareness may include a latitude of aerial vehicle 12, a latitude of the potential conflict, a longitude of aerial vehicle 12, a longitude of the potential conflict, a speed of aerial vehicle 12, a speed of the potential conflict, an altitude of aerial vehicle 12, and/or an altitude of the potential conflict. Processing unit 40 may be configured to update the virtual situational awareness at least every 0.1 second, at least every 0.5 second, at least every 1 second, at least every 2 seconds, at least every 3 seconds, at least every 4 seconds, and/or at least every 5 seconds. Sensors 34 and ADS-B unit 36 may be selected to minimize size, weight, and/or costs, in some examples, to optimize use on smaller aerial vehicles.

In some examples, sensor 34 is configured to detect and/or receive information regarding any potential conflict that comes within a predetermined threshold distance from aerial vehicle 12 (or any potential conflict that aerial vehicle 12 comes within a predetermined threshold distance of). For example, if another aircraft were to come within a predetermined distance of aerial vehicle 12, one or more sensors 34 may be configured to detect and/or measure the size, speed, and/or direction of travel of the other aircraft. Additionally or alternatively, sensor 34 may be configured to measure and/or detect the distance between aerial vehicle 12 and the other aircraft. Generally, processing unit 40 is configured to generate a situational awareness (also referred to as a situational data set) regarding any potential conflicts within a predetermined distance of aerial vehicle 12, based on information received from sensor 34 and/or ADS-B unit 36. Such situational awareness of the other aircraft or other potential conflicts may enable processing unit 40 to determine the likelihood of collision between aerial vehicle 12 and the potential conflict, and/or to determine whether a deviating condition is present, and/or to determine whether a contingency maneuver should be triggered, and/or to determine which contingency maneuver should be triggered (e.g., in examples where system 42 is configured to initiate a plurality of different contingency maneuvers in response to deviating conditions). In some examples, system 42 is configured to communicate such data regarding potential conflicts and deviating conditions to a remotely-positioned operator (e.g., via user interface 44 at ground control station 24). User interface 44 may thus be configured to communicate information from processing unit 40 to an operator at ground control station 24, in some aerial environments 10.

The predetermined distance in which potential conflicts are monitored is generally stored on memory 48 of processing unit 40. In some examples, memory 48 may store a plurality of different predetermined distances, where the predetermined distance is selected from among the plurality of different predetermined distances, based on the current status of aerial vehicle 12. For example, the predetermined distance in which potential conflicts are monitored may be smaller when aerial vehicle 12 is traveling at lower speeds and/or altitudes, and the predetermined distance in which potential conflicts are monitored may be larger when aerial vehicle 12 is traveling at higher speeds and/or altitudes. In these examples, system 42 may be configured to detect potential conflicts within a larger radius when the situation warrants it.

When processing unit 40 identifies a deviating condition (e.g., a potential conflict within a certain distance of aerial vehicle 12, a threshold likelihood of collision, aerial vehicle 12 exceeding a maximum absolute altitude, etc.), processing unit 40 triggers, or initiates, a contingency maneuver in order to mitigate and/or remove the deviating condition. Generally, such contingency maneuvers cause an alteration in the flight path of aerial vehicle 12, such as a change in altitude, speed, location (e.g., a location of aerial vehicle 12 relative to a potential conflict), and/or direction of travel of aerial vehicle 12. Additionally or alternatively, contingency maneuvers may include flight path interruptions such as disconnecting power to aerial vehicle 12, terminating the flight of aerial vehicle 12, reducing power to aerial vehicle 12, triggering a low-battery or low-voltage mode/condition of aerial vehicle 12, initiating a fly-home or return-to-base operation of aerial vehicle 12, initiating a self-destruction protocol, triggering an emergency landing of aerial vehicle 12, and/or activating a control surface 52 that spoils some of the thrust of aerial vehicle 12. In some examples, contingency maneuvers may include substantially holding the position of aerial vehicle 12 constant, until the potential conflict passes outside a predetermined radius away from aerial vehicle 12, and/or until the deviating condition is mitigated. Contingency maneuvers may be predetermined and stored on memory 48, in some systems 42. In such examples, processing unit 40 may select which of the stored contingency maneuvers to initiate, in response to a given deviating condition.

In some examples, processing unit 40 is configured to trigger a contingency maneuver by interrupting and/or modifying a pulse-width modulated (PWM) signal, and/or by interrupting and/or modifying serial traffic, thereby modifying a speed controller signal received by a speed controller 60 of aerial vehicle 12, wherein the speed controller signal is configured to control the speed of aerial vehicle 12. For example, if speed controller 60 of aerial vehicle 12 takes a PWM signal input for throttle control, said PWM signal may be modified to lose thrust, and/or cause descent of aerial vehicle 12. In examples where speed controller 60 receives serial messages/signal input, processing unit 40 may trigger a contingency maneuver by reading the serial messages, altering them, and then transmitting them (while minimizing latency), or by disconnecting the serial data bus. Similarly, and additionally or alternatively, processing unit 40 may trigger a contingency maneuver by interrupting and/or modifying a speed controller throttle signal to reduce thrust to aerial vehicle 12 and/or cause descent of aerial vehicle 12.

In some examples, systems 42 may include a switch 50 that, when activated by processing unit 40, triggers, or initiates, one or more contingency maneuvers. In other examples, system 42 may simply generate a signal to trigger one or more contingency maneuvers. In examples including a switch, switch 50 may be a plurality of switches 50 in some systems 42. For example, each respective switch 50 of a plurality of switches 50 may be configured to modify and/or terminate a different respective portion or component of aerial vehicle 12. Switch 50 may be any suitable switch, including but not limited to an electronic switch, an electromechanical switch, a MOSFET switch, and/or a solid state switch.

For example, switch 50 may be configured to cause a contingency maneuver that is physical or electric in nature. In some examples, activation of switch 50 may interrupt, modify, attenuate, and/or block one or more signals and/or power to one or more components on board aerial vehicle 12. Additionally or alternatively, activation of switch 50 may activate a physical component on aerial vehicle 12, such as control surface 52, an emergency landing system 54, and/or a descent stabilizer 56. In specific examples, activation of switch 50 may interface with a common element with, for example, a flight control computer 62. For example, activation of switch 50 may interrupt a battery feed 59 from a main propulsion battery 58 to speed controller 60 (e.g., battery feed 59a), to flight control computer 62 (e.g., battery feed 59b), and/or to a motor 64 (e.g., a propulsion motor) of aerial vehicle 12 (e.g., battery feed 59c). In other words, processing unit 40 may trigger a contingency maneuver by preventing the propulsion motor (or other motor of aerial vehicle 12) from receiving power from main propulsion battery 58 (or from another battery of aerial vehicle 12). Alternatively, processing unit 40 may trigger a contingency maneuver by reducing the amount of power received by a main propulsion motor (or other motor) from main propulsion battery 58 (or another battery). In such examples, main propulsion battery feed 59 may be configured to deliver power from on-board battery 58, and switch 50 may be operatively coupled to battery 58, motor 64, speed controller 60, and/or flight control computer 62 such that activation of switch 50 interrupts, modifies, attenuates, and/or blocks power from battery 58 to one or more of motor 64, flight control computer 62, and speed controller 60, when switch 50 is activated. Additionally or alternatively, switch 50 may interface with a different common element, such as an electric propulsion motor, a propulsion battery pack, and/or a speed controller of aerial vehicle 12.

For example, flight control computer 62 may be configured to actuate a throttle of aerial vehicle 12, control a speed of aerial vehicle 12, control an altitude of aerial vehicle 12, control a pitch of aerial vehicle 12, control a heading of aerial vehicle 12, control a climb rate of aerial vehicle 12, control a descent rate of aerial vehicle 12, control a bank angle of aerial vehicle 12, and/or control a turn rate of aerial vehicle 12. Accordingly, switch 50 may be activated (e.g., when processing unit 40 detects a deviating condition) to reduce or block power to flight control computer 62, which may in turn affect the ability of flight control computer 62 to control the throttle, speed, altitude, pitch, heading, climb rate, descent rate, bank angle, and/or turn rate of aerial vehicle 12. Thus, flight control computer 62 may be at least partially overridden by system 42 in order to perform the contingency maneuver and change at least one parameter of the flight of aerial vehicle (e.g., change the speed, altitude, pitch, heading, climb rate, descent rate, bank angle, location, direction of travel, and/or turn rate of aerial vehicle 12), thereby altering and/or terminating the flight path of aerial vehicle 12. Processing unit 40 may be configured to determine which contingency maneuver or plurality of contingency maneuvers may be performed to avoid and/or mitigate the particular detected deviating condition.

Additionally or alternatively, activation of switch 50 may interrupt, modify, attenuate, and/or block signals from flight control computer 62 and/or speed controller 60, such that the flight of aerial vehicle 12 is altered, thereby mitigating the detected deviating condition. In some examples, switch 50 may be configured to terminate flight of aerial vehicle 12 when switch 50 is activated.

In some examples, activation of switch 50 actuates control surface 52, thereby spoiling some of the thrust of aerial vehicle 12. Control surface 52 may be configured to be selectively transitioned between a first configuration and a second configuration, wherein in the first configuration, control surface 52 is positioned and/or oriented to have a minimum impact on the flight path of aerial vehicle 12, and wherein in the second configuration, control surface 52 is positioned and/or oriented to have a maximum impact (e.g., reducing thrust) on the flight path of aerial vehicle 12. Switch 50, when triggered by processing unit 40, activates control surface 52 by transitioning it from the first configuration to the second configuration. As used herein, "control surfaces" are aerodynamic devices that allow adjustment and/or control of the flight attitude of aerial vehicle 12. For example, control surface 52 may include one or more flaps, rudders, ailerons, elevators, spoilers, slats, and/or air brakes.

In some examples, control surface 52 may be provided in the form of a flat surface that tilts to mask some of the prop disk, such as may be useful for multicopters. In one specific example, control surface 52 is a rudder that may be aerodynamically aligned in the first configuration to accommodate aerial vehicle 12 flying along its current course of direction, but that may be transitioned to a second configuration (e.g., having a different orientation or angle with respect to aerial vehicle 12), when activated by switch 50. For example, processing unit 40 may activate switch 50 to turn the rudder, thereby performing the contingency maneuver of steering aerial vehicle 12 away from a potential conflict.

To detect deviating conditions and/or potential conflicts (e.g., objects or obstacles near aerial vehicle 12 that may become a deviating condition if criteria are met), processing unit 40 uses information from navigation system 38. For example, navigation system 38 may provide information about aerial vehicle 12 (e.g., sensor data) sufficient for processing unit 40 to create or identify a first situational data set with information about the current state of aerial vehicle 12, such as location, speed, direction or travel, and/or altitude. Instructions 41 cause processing unit 40 to compare the first situational data set to one or more other situational data sets. In some examples, the first situational data set may be compared to a second situational data set of a potential conflict, and/or a second situational data set stored on memory 48 of processing unit 40. For example, processing unit 40 may compare the first situational data set of aerial vehicle 12 to a second situational data set of a potential conflict (which may include, for example, an altitude, a speed, a size, a relative location, and/or a direction of travel of the potential conflict, as identified by processing unit 40 based on information or signals received by ADS-B unit 36 and/or other sensor data from sensor 34), to determine whether a deviating condition exists. For example, memory 48 may have criteria stored, such as a threshold minimum distance between aerial vehicle 12 and other objects or obstacles. If comparing the situational data sets reveals that aerial vehicle 12 would get closer to another object or obstacle than the minimum threshold distance, then processing unit 40 may initiate a contingency maneuver to mitigate this deviating condition, such as by changing the position of aerial vehicle 12 relative to the object/obstacle and/or changing the flight path of aerial vehicle 12 to ensure that it maintains a distance from the other object/obstacle that is greater than the threshold minimum distance.

In some examples, in addition to or instead of comparing the first situational data set to a situational data set of another aircraft, processing unit 40 may be configured to compare the first situational data set to a situational data set stored on memory 48. For example, the first situational data set may be compared to a second situational data set of aerial vehicle 12, where such second situational data set may include, for example, a maximum absolute altitude of aerial vehicle 12 (and/or a maximum height above the ground), a minimum distance of aerial vehicle 12 from a potential conflict, and/or a maximum distance of aerial vehicle 12 from an operator. The maximum absolute altitude for aerial vehicle 12 may be predetermined and may be, for example, a height of 1500 feet or less above the ground, 1000 feet or less above the ground, 500 feet or less above the ground, 400 feet or less above the ground, 300 feet or less above the ground, 200 feet or less above the ground, and/or 100 feet or less above the ground. The maximum absolute altitude for aerial vehicle 12 may be defined as height above sea level, in some examples. In some examples, the maximum altitude of aerial vehicle 12 allowed by system 42 may be selectively alterable depending on location and/or surrounding buildings or other obstacles. If, when comparing the first situational data set to the second situational data set, processing unit determines that aerial vehicle 12 is at an altitude that is above the maximum absolute altitude, the processing unit would then trigger a contingency maneuver to mitigate this deviating condition. For example, processing unit 40 may trigger any contingency maneuver that reduces the altitude of aerial vehicle 12 until it is below the maximum absolute altitude.

As described herein, criteria may be stored on instructions 41 of processing unit 40 of system 42, for determining whether a deviating condition exists. For example, the criteria may be exceeding a maximum absolute altitude of aerial vehicle 12, subceeding a minimum distance between aerial vehicle 12 and any potential conflict, exceeding a maximum closing speed of a potential conflict, and/or exceeding a preconfigured maximum distance from an operator of aerial vehicle 12. As used herein, a minimum distance is subceeded if aerial vehicle 12 gets closer to the potential conflict than the predetermined minimum distance.

In some examples, instructions 41 cause processing unit 40 to transmit information regarding any potential conflicts and/or deviating conditions to ground control station 24. For example, processing unit 40 may signal to ground control station 24 when a potential conflict is detected within a predetermined radius of aerial vehicle 12, and may additionally transmit information when a deviating condition is detected (such as if processing unit 40 determines that the current flight paths of aerial vehicle 12 and the potential conflict are likely to intersect). While system 42 is generally configured to override user command signals from ground control station 24, in some examples, processing unit 40 may be configured to wait a predetermined amount of time after detecting the potential conflict before triggering a contingency maneuver, in order to provide an opportunity for a user to mitigate the deviating condition. For example, processing unit 40 may transmit information to ground control station 24 regarding a potential conflict and/or deviating condition, then wait a predetermined amount of time, and may be configured to only trigger a contingency maneuver if the deviating condition isn't mitigated by the user during the predetermined amount of time. Additionally or alternatively, processing unit 40 may be configured to block, attenuate, and/or interrupt any user command signals received from ground control station 24 after detecting the deviating condition and/or after waiting a predetermined amount of time after communicating the deviating condition to ground control station 24. For example, processing unit 40 may attenuate any user command signals received after detecting a deviating condition, thereby rendering the user command signals weaker and/or less effective than they would be otherwise. In one illustrative example, if a user at ground control station 24 sends a user command signal that attempts to increase the speed and/or altitude of aerial vehicle 12 after processing unit 40 detects a deviating condition, processing unit 40 may be configured to attenuate the user command signal so that aerial vehicle 12 does not increase in speed and/or altitude, and/or increases in speed and/or altitude to a lesser extent than the user command signals would otherwise create. The degree of attenuation may be variable in some examples, such as being varied in proportion to the distance between aerial vehicle 12 and a given potential conflict. For example, user command signals may be attenuated by processing unit 40 to a greater degree the closer aerial vehicle 12 gets to the potential conflict. In some cases, processing unit 40 may ensure that any user command signals sent after detecting the deviating condition are not carried out by aerial vehicle 12, such as by blocking the signals to prevent aerial vehicle 12 from receiving them.

In some examples, aerial vehicle 12 includes emergency landing system 54, configured to reduce or prevent damage to aerial vehicle 12 in the event that a contingency maneuver is triggered. Emergency landing system 54 may be deployed automatically, or via system 42, in the course of a contingency maneuver. For example, emergency landing system 54 may deploy automatically if a sudden drop in speed or altitude is detected by a sensor of emergency landing system 54. In some examples, processing unit 40 may deploy emergency landing system 54 when it triggers a contingency maneuver, which may be shortly before triggering the contingency maneuver, shortly after triggering the contingency maneuver, or substantially simultaneously with triggering the contingency maneuver. For example, if processing unit 40 triggers a contingency maneuver that includes a power shut off or that would otherwise potentially result in an abrupt drop in altitude or a potential collision with the ground or other object below it, processing unit 40 may also deploy emergency landing system 54, such as to limit the impacts of such contingency maneuver. Emergency landing system 54 may include, for example, airbags, cushions, springs, shock attenuators, and/or other dampeners.

Additionally or alternatively, aerial vehicle 12 may include one or more descent stabilizers 56, configured to stabilize and/or slow the descent of aerial vehicle 12 in the event of a power reduction or termination. Similar to emergency landing system 54, descent stabilizer 56 may be deployed automatically, or via system 42, in the course of a contingency maneuver. For example, descent stabilizer 56 may deploy automatically if a sudden drop in speed or altitude is detected by a sensor of descent stabilizer 56. In some examples, processing unit 40 may deploy descent stabilizer 56 when it triggers a contingency maneuver, which may be shortly before triggering the contingency maneuver, shortly after triggering the contingency maneuver, or substantially simultaneously with triggering the contingency maneuver. For example, if processing unit 40 triggers a contingency maneuver that includes a power shut off or that would otherwise potentially result in an abrupt drop in altitude or a potential collision with the ground or other object below it, processing unit 40 may also deploy descent stabilizer 56, such as to limit the impacts of such contingency maneuver. Descent stabilizer 56 may include, for example, one or more parachutes, foam structures, airbags, and/or springs.

Some aerial vehicles 12 may include a dedicated battery 66 to power processing unit 40 and/or other components of system 42. Additionally or alternatively, processing unit 40 (and/or other components of system 42) may be powered by an existing battery on board aerial vehicle 12 that powers one or more other components of aerial vehicle 12, such as main propulsion battery 58.

Generally, processing unit 40 is coupled to aerial vehicle 12 (e.g., positioned on board aerial vehicle 12). In some examples, aerial vehicle 12 may be preconfigured to include system 42, processing unit 40, and/or computer-readable memory 48. For example, processing unit 40 may be integrated into aerial vehicle 12 at the time of manufacture. In other examples, a given aerial vehicle 12 may be outfitted (e.g., retrofit) with system 42, processing unit 40, and/or computer readable memory 48 after its initial manufacture. Accordingly, processing units 40 according to the present disclosure, systems 42 according to the present disclosure, and/or a computer-readable medium containing instructions 41 according to the present disclosure may be provided apart from aerial vehicle 12, as an add-on component, in some cases.

Figure 3:
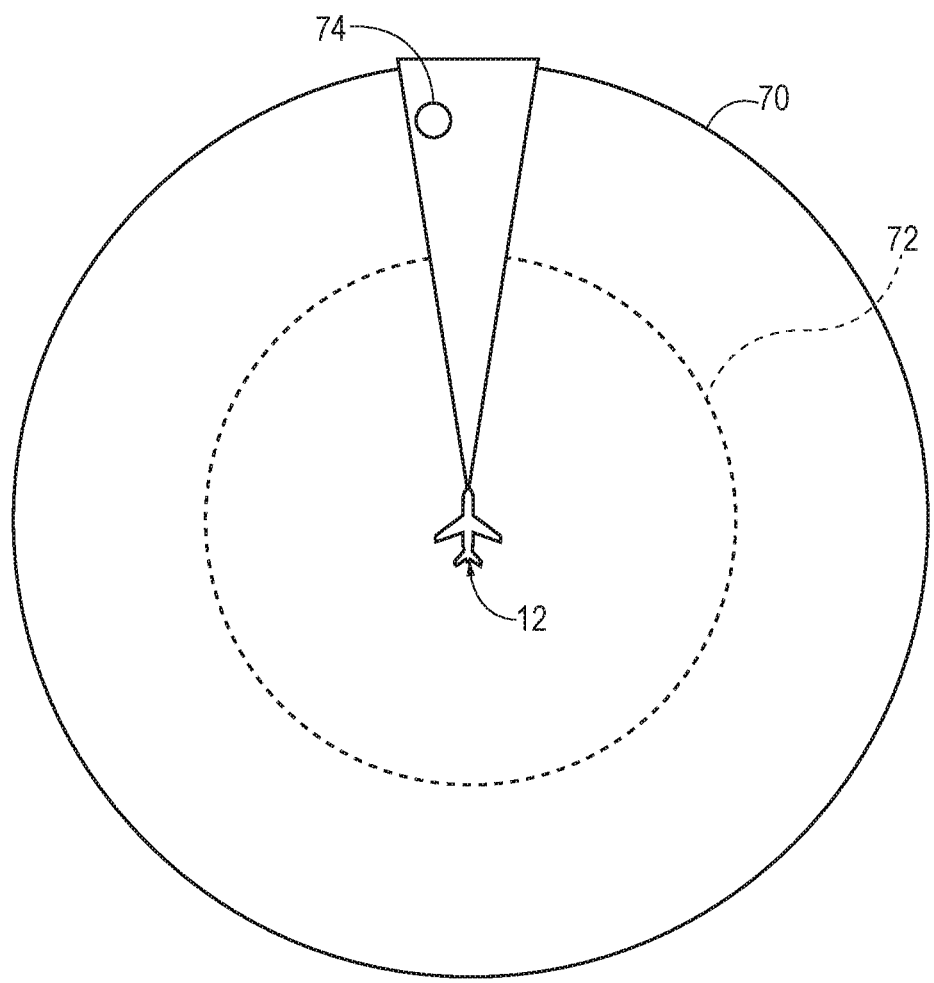
FIG. 3 is a schematic representation of airspace around an aerial vehicle, which may contain one or more potential conflicts.

In use, processing unit 40 may be configured to record a respective situational data set for every respective potential conflict located within a predetermined radius of aerial vehicle 12. Such predetermined radius may be defined in a plurality of different planes. For example, as shown in FIG. 3, an object may be considered a potential conflict if it is located within an area defined by a first radius, as indicated by circle 70 surrounding aerial vehicle 12 (e.g., extending in front of, to the sides, and/or behind aerial vehicle 12). One or more secondary radii may be predetermined, so as to define a plurality of predetermined zones surrounding aerial vehicle 12, such as indicated by circle 72. In such cases, a potential conflict within closer zones (e.g., inside circle 72) may be treated as a higher priority (e.g., monitored more frequently, and/or resulting in a faster and/or more severe contingency maneuver) than potential conflicts that are farther away from aerial vehicle 12.

Figure 4:
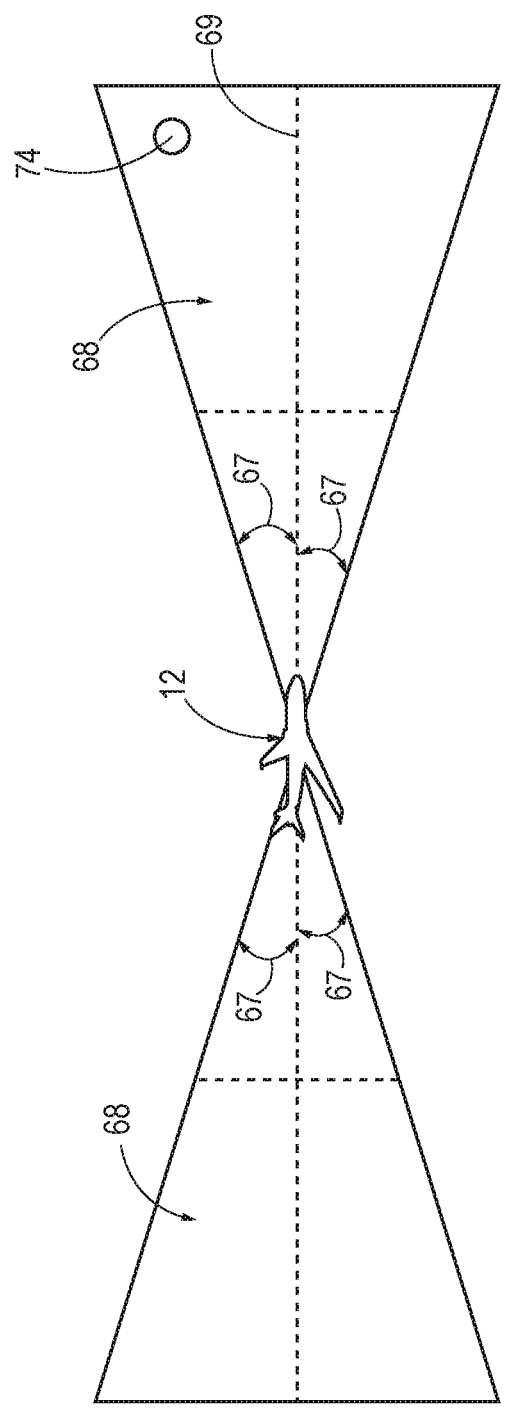
FIG. 4 is a schematic cross-sectional representation of airspace surrounding an aerial vehicle, which may contain one or more potential conflicts.

Processing unit 40 (FIG. 2) may be configured to record a respective second situational data set regarding a position of any potential conflict located within the desired radius (e.g., any potential conflict within circle 70, such as potential conflict 74 shown in FIG. 3), and thereby determine the position of aerial vehicle 12 with respect to the potential conflict based on sensor data and automatic dependent surveillance-broadcast signals from the potential conflict, create a virtual situational awareness (which may also be referred to as a situational awareness image) of aerial vehicle 12 relative to any such potential conflicts, and update the virtual situational awareness at a desired frequency, such as at least once per second. In some examples, system 42 is configured to monitor any potential conflicts within, for example, 100 feet, 200 feet, 300 feet, 400 feet, 500 feet, 600 feet, 700 feet, 800 feet, 900 feet, 1000 feet, 2000 feet, 3000 feet, 4000 feet, and/or within 5000 feet of aerial vehicle 12. In some examples, the criteria for a deviating condition may include merely detecting a potential conflict within a given radius from aerial vehicle 12. Potential conflicts 74 may also be tracked and/or monitored within surrounding areas in front of and/or behind aerial vehicle 12, and/or above and below aerial vehicle 12, such as illustrated in FIG. 4. In some examples, areas 68 may be defined as the airspace extending from aerial vehicle 12, above and below a horizon line 69. Such areas 68 for monitoring potential conflicts may be defined by an angle 67 above and/or below horizon line 69, in some examples.

Figure 5:
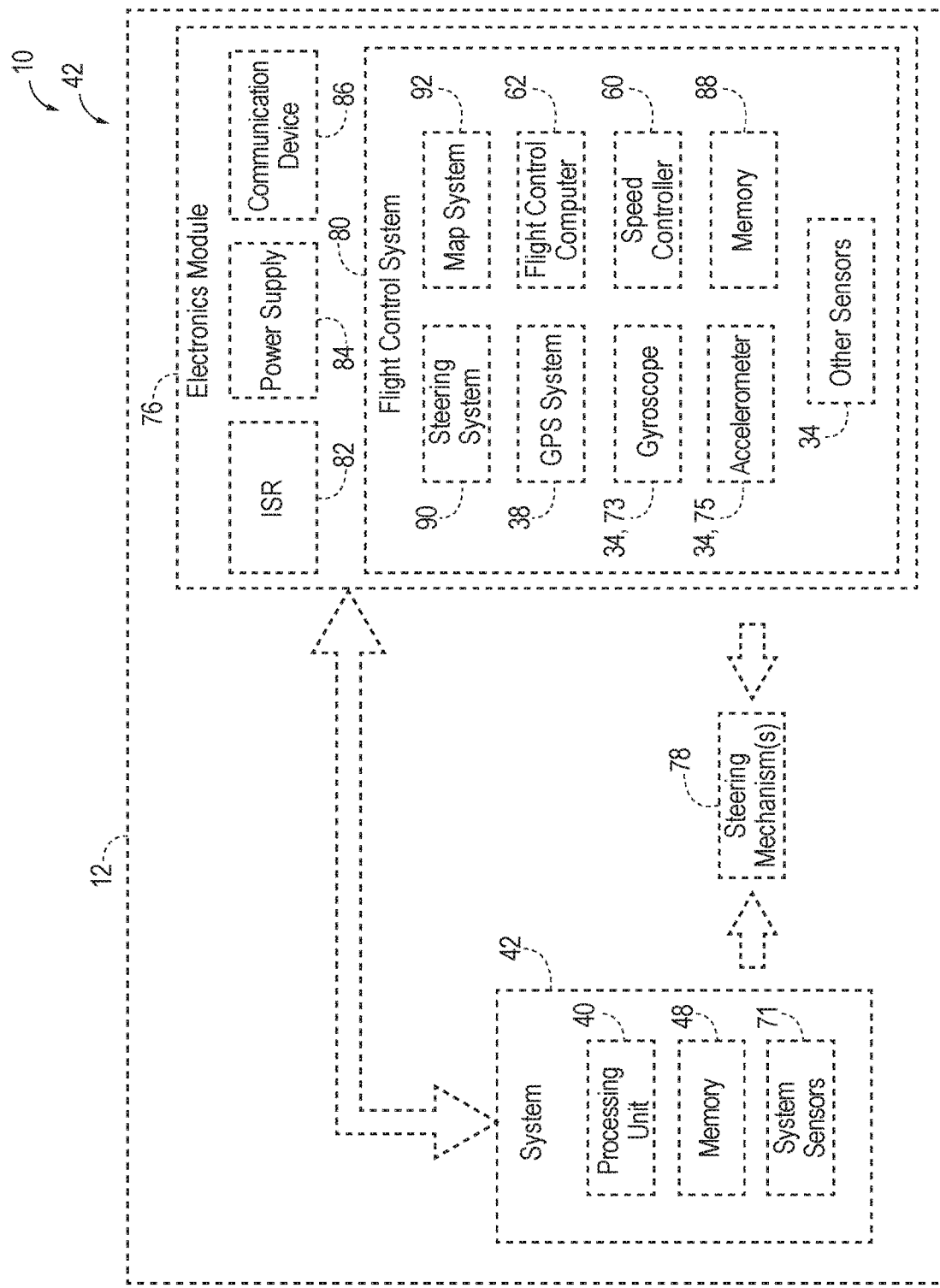
FIG. 5 is a schematic, black-box representation of non-exclusive examples of aerial vehicles according to the present disclosure.
Figure 6:
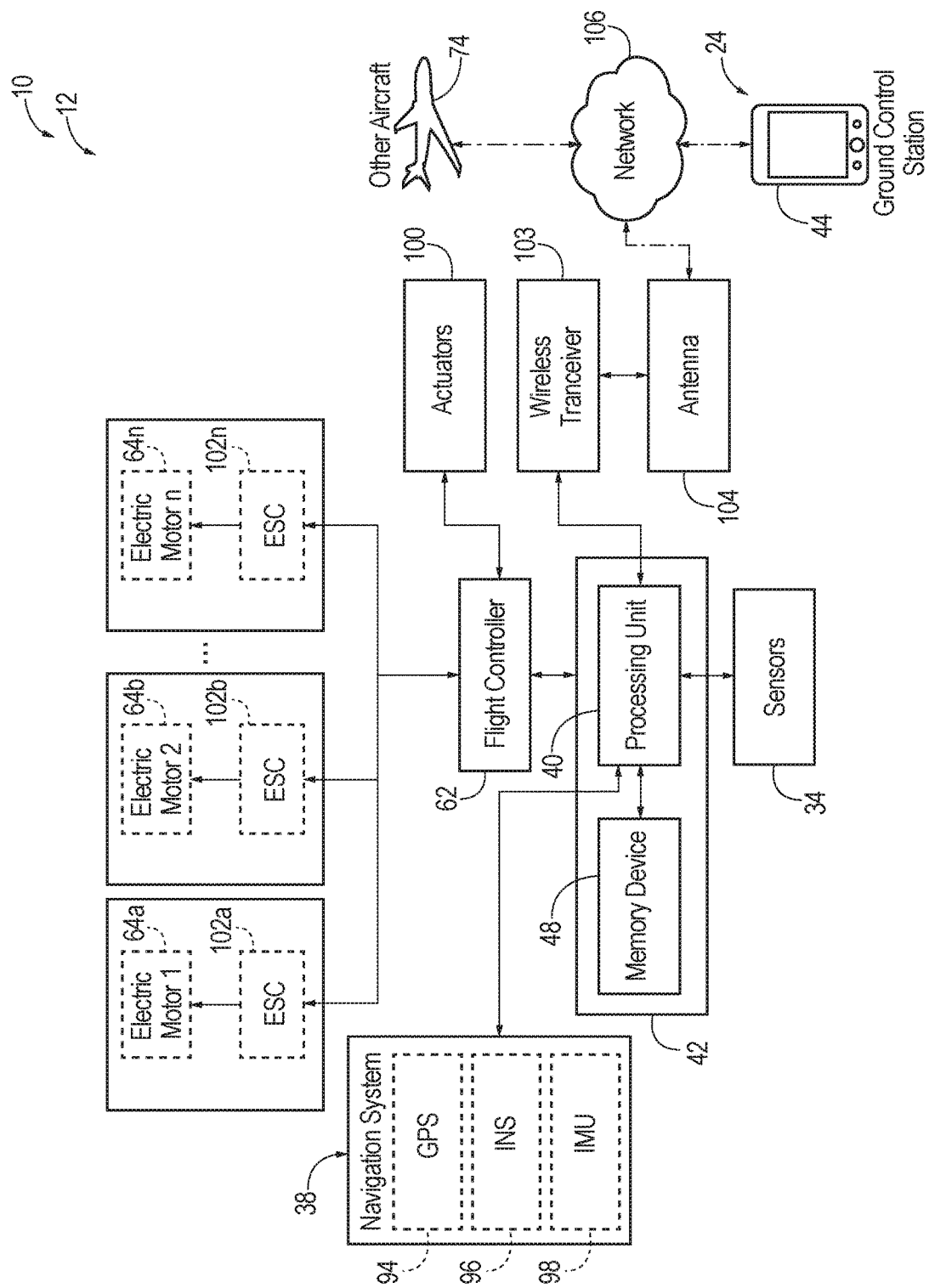
FIG. 6 is a schematic representation of non-exclusive examples of systems according to the present disclosure.

Turning now to FIGS. 5-6, illustrative non-exclusive examples of aerial vehicle 12 and systems 42 are illustrated. Where appropriate, the reference numerals from the schematic illustrations of FIGS. 1-2 are used to designate corresponding parts of FIGS. 5-6; however, the examples of FIGS. 5-6 are non-exclusive and do not limit aerial vehicles 12 and/or systems 42 to the illustrated embodiments of FIGS. 5-6. That is, aerial vehicles 12 and systems 42 are not limited to the specific embodiments of those illustrated in FIGS. 5-6, and aerial vehicles 12 and systems 42 may incorporate any number of the various aspects, configurations, characteristics, properties, etc. that are illustrated in and discussed with reference to the schematic representations of FIGS. 1-2 and/or the embodiments of FIGS. 5-6, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in FIGS. 5-6, however, it is within the scope of the present disclosure that the previously discussed features, variants, etc. may be utilized with the examples shown in FIGS. 5-6.

FIG. 5 schematically illustrates examples of aerial vehicle 12 having system 42 integrated therein. System 42, as shown in FIG. 5, may include processing unit 40 and memory 48. In some examples, system 42 includes one or more system sensors 71 configured to provide information to processing unit 40. System sensors 71 may include, for example, any sensor 34 described above. Additionally or alternatively, system 42 may receive information from other sensors 34 on board aerial vehicle 12, such as gyroscope 73, accelerometer 75, and/or one or more other sensors 34. Systems 42 may be configured to interface with one or more other systems on board aerial vehicle 12, such as with an electronics module 76, with a steering mechanism 78, and/or with a flight control system 80. Electronics module 76 may include, for example, an ISR system 82 for intelligence, surveillance, target acquisition, and/or reconnaissance operations, a power supply 84 (e.g., one or more batteries or other power supplies), and/or one or more communications devices 86 (which may include a radio transmitter or other wireless communications device). Flight control system 80 may include flight control computer 62, speed controller 60, navigation system 38, a memory 88, one or more sensors 34, a steering system 90, and/or a map system 92.

FIG. 6 schematically illustrates another example of aerial environment 10, including ground control station 24 and aerial vehicle 12. In the example of FIG. 6, navigation system 38 and processing unit 40 of system 42 interface with one another, with system 42 additionally interfacing with one or more sensors 34 and flight control computer 62 (also referred to herein as a flight controller 62). Navigation system 38 may include a GPS unit 94 (which is an example of sensor 34), an inertial navigation system (INS) 96, and/or an inertial measurement unit (IMU) 98, in some examples. Flight controller 62 may be configured to interface with one or more actuators 100 and/or one or more motors 64 (e.g., motor 64a, motor 64b, motor 64n, and etc.), each of which may be controlled via a respective electronic speed controller (ESC) 102, in some examples (e.g., ESC 102a, ESC 102b, ESC 102n, etc.). In other examples, a single ESC 102 may control a plurality of motors 64. A wireless transceiver 103 and/or antenna 104 may interface between system 42 and a network 106, in some examples. Network 106 may also interface with one or more other aircraft, such as potential conflicts 74, and ground control station 24.

Figure 7:
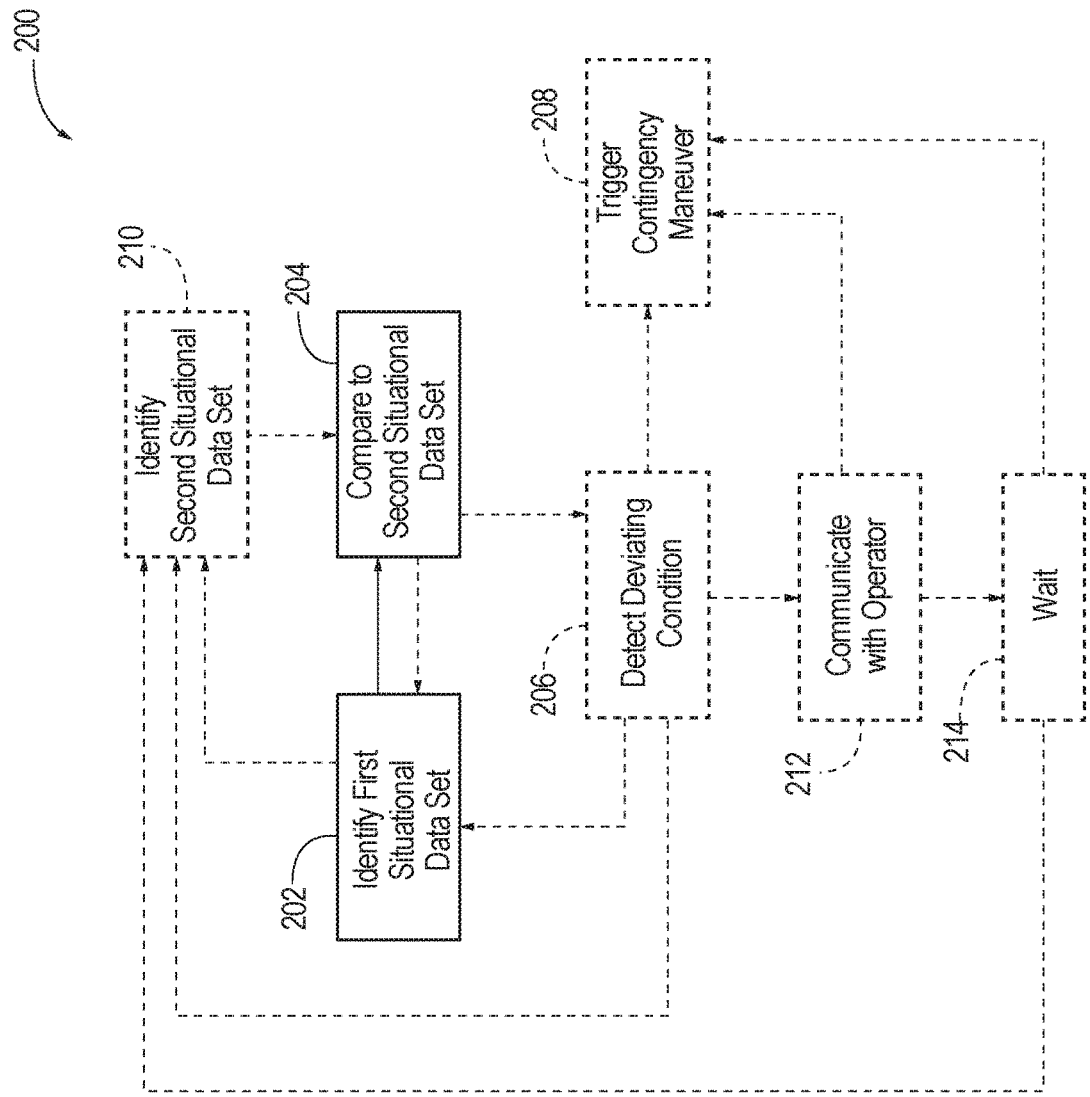
FIG. 7 is a schematic flowchart diagram of methods of causing an aerial vehicle to perform a contingency maneuver to mitigate a detected deviating condition.

FIG. 7 schematically provides a flowchart that represents illustrative, non-exclusive examples of methods 200 of causing an aerial vehicle (e.g., aerial vehicle 12) to perform a contingency maneuver, according to the present disclosure. In FIG. 7, some steps are illustrated in dashed boxes indicating that such steps may be optional or may correspond to an optional version of a method according to the present disclosure. That said, not all methods 200 according to the present disclosure are required to include the steps illustrated in solid boxes. The methods and steps illustrated in FIG. 7 are not limiting and other methods and steps are within the scope of the present disclosure, including methods 200 having greater than or fewer than the number of steps illustrated, as understood from the discussions herein.

Methods 200 generally include identifying a first situational data set of the aerial vehicle at 202 and comparing the first situational data set to a second situational data set at 204. As a result of the comparing the first and second situational data sets, a deviating condition may be detected, or identified, at 206, if information from the first and second situational data sets warrants, based on criteria stored on non-transitory computer readable memory of a processing unit of the aerial vehicle (e.g., memory 48 of processing unit 40). In some examples, detecting a deviating condition at 206 includes detecting a potential conflict (e.g., another aircraft, an obstacle, an animal, etc.) within a predetermined radius of the aerial vehicle. The identification of the first situational data set at 202, comparing the two situational data sets at 204, and detecting a deviating condition at 206 are all performed by the processing unit on board the aerial vehicle. In the event that a deviating condition is detected at 206, the processing unit triggers a contingency maneuver at 208, with said contingency maneuver being designed to mitigate the deviating condition. For example, triggering the contingency maneuver at 208 generally alters the flight path (e.g., speed, location, altitude, and/or direction of travel) of the aerial vehicle, in order to remove the deviating condition and/or avoid collision with a potential conflict. The contingency maneuver is triggered at 208 automatically (e.g., without external input) by the processing unit, thus ensuring that the aerial vehicle avoids the potential conflict, and/or otherwise remains within the predetermined parameters for its flight.

In some methods 200, comparing the first and second situational data sets at 204 includes comparing the first situational data set (having data concerning, for example, the current speed, location, altitude, size, relative location, and/or direction of travel of the aerial vehicle) to a second situational data set stored on the memory of the processing unit. For example, the processing unit may store a data set with boundaries, or limits, for the flight of the aerial vehicle. For example, the second situational data set may include a maximum absolute altitude for the aerial vehicle, a maximum height above ground for the aerial vehicle, a maximum speed of the aerial vehicle, a maximum distance from an operator for the aerial vehicle, and/or a minimum distance from a known or detected obstacle. In the instance that the processing unit determines (by comparing the current position/speed/altitude/etc. of the aerial vehicle in the first situational data set with the information stored in the second situational data set) that the aerial vehicle is, for example, currently at a higher altitude than a maximum allowable altitude of the second situational data set, the deviating condition would thus be detected at 206, and a contingency maneuver would be triggered at 208, such as to lower the altitude of the aerial vehicle until it is below the maximum allowable altitude stored in the second situational data set.

Additionally or alternatively, comparing the first and second situational data sets at 204 may include comparing the first situational data set to a second situational data set of a potential conflict, with said second situational data set being identified by the processing unit at 210. For example, the aerial vehicle generally includes an automatic dependent surveillance-broadcast messaging receiver (e.g., ADS-B unit 36) configured to receive and/or automatic dependent surveillance-broadcast signals from other aircraft nearby the aerial vehicle. The processing unit can identify a respective second situational data set for any respective potential conflict, based on this received automatic dependent surveillance-broadcast information. Each respective second situational data set may include information regarding an altitude, a speed, a size, a relative location, and/or a direction of travel of the respective potential conflict, at the time the second situational data set is identified. In some examples, the second situational data set may include a projected course of travel for the potential conflict, based on current conditions and/or data. Such second situational data sets may be identified for any respective potential conflict within a predetermined radius of the aerial vehicle, and/or may be updated periodically at 210 (the first situational data set also may be updated periodically at 202). In some examples, the first situational data set is re-identified (e.g., updated) at 202 more frequently the faster the aerial vehicle is traveling. Similarly, a respective second situational data set of a respective potential conflict may be updated at 210 more frequently the faster the respective potential conflict is traveling, and/or the closer the respective potential conflict is to the aerial vehicle.

In examples where the processing unit detects a deviating condition at 206 based on a potential conflict, triggering the contingency maneuver at 208 generally includes altering the position of the aerial vehicle with respect to the potential conflict, in order to avoid said potential conflict. For example, triggering the contingency maneuver at 208 may alter an altitude of the aerial vehicle, a speed of the aerial vehicle, a location of the aerial vehicle, a relative location of the aerial vehicle relative to a respective potential conflict, and/or a direction of travel of the aerial vehicle, thereby mitigating the deviating condition and/or avoiding contact between the aerial vehicle and the potential conflict. In some methods 200, triggering the contingency maneuver at 208 includes shutting down power to the aerial vehicle and/or causing the aerial vehicle to fly to a predetermined location (e.g., to a ground control station, or other base, waypoint, or known location). Triggering a contingency maneuver at 208 may include activating a switch (e.g., switch 50) on board the aerial vehicle to, for example, interrupt a main propulsion battery feed (e.g., battery feed 59) on board the aerial vehicle, interrupt power to a flight control computer (e.g., flight control computer 62) on board the aerial vehicle, interrupt a speed controller signal configured to control a speed of the aerial vehicle (e.g., a signal from speed controller 60), activate a control surface (e.g., control surface 52) coupled to the aerial vehicle by transitioning the control surface from a first configuration to a second configuration, terminate the flight of the aerial vehicle, cause the aerial vehicle to lose altitude, initiate a fly-home maneuver of the aerial vehicle, trigger an emergency landing maneuver of the aerial vehicle, and/or trigger a low-battery mode of the aerial vehicle. In some examples, triggering a contingency maneuver at 208 includes preventing a motor on board the aerial vehicle (e.g., a propulsion motor) from receiving power from the on-board battery or other power source, and/or reducing the amount of power received by the motor. Triggering a contingency maneuver at 208 may include causing the aerial vehicle to maintain a minimum predetermined distance from any detected potential conflict.

In some examples, triggering the contingency maneuver at 208 may include triggering a plurality of contingency maneuvers. Additionally or alternatively, triggering the contingency maneuver at 208 may include selecting one or more contingency maneuvers from among a plurality of potential contingency maneuvers, in response to the particular deviating condition detected at 206. For example, the processing unit may, in some deviating conditions, trigger a contingency maneuver at 208 that slows down the aerial vehicle, in order to avoid a potential conflict. In other examples, the processing unit may trigger a contingency maneuver at 208 that speeds up the aerial vehicle, in order to avoid a potential conflict. Additionally or alternatively, triggering a contingency maneuver at 208 may include attenuating a control signal, such as a control signal received from a ground control station, or a control signal generated on the aerial vehicle.

Identifying the first situational data set at 202 generally includes receiving sensor data from one or more sensors (e.g., sensor 34) on board the aerial vehicle, while the aerial vehicle is in flight. For example, the first situational data set may be identified at 202 by receiving GPS data from a sensor configured to communicate such sensor data to the processing unit. Additionally or alternatively, the first situational data set may be identified at 202 using signals from other sensors, such as altimeters, accelerometers, gyroscopes, radar, and/or other sensors on board the aerial vehicle. In some examples, the first situational data set may include a projected course of travel for the aerial vehicle, based on current conditions and/or data. In some examples, the aerial vehicle includes an ADS-B unit configured to compile and transmit ADS-B out messages. In such examples, identifying the first situational data set at 202 may include transmitting ADS-B Out messages with such information about the aerial vehicle.

Comparing the situational data sets at 204 may include creating a virtual situational awareness of the aerial vehicle and any potential conflict identified by disclosed systems. For example, the processing unit may be configured to create a virtual situational awareness of any potential conflict that comes within a predetermined radius of the aerial vehicle, and to update the virtual situational awareness periodically. For example, the virtual situational awareness may be updated at least 0.1 second intervals (e.g., at least once every 0.1 seconds), at least 0.5 second intervals, at least 1 second intervals, at least 2 second intervals, at least 3 second intervals, and/or at least 5 second intervals.

Detecting a deviating condition at 206 is generally performed by comparing the first situational data set with one or more second situational data sets at 204, in view of at least one criteria stored on the memory of the processing unit. For example, the criteria may include exceeding a maximum absolute altitude (or maximum height off the ground) of the aerial vehicle, subceeding a minimum distance between the aerial vehicle and any potential conflict, exceeding a maximum closing speed of a potential conflict headed towards the aerial vehicle, and/or exceeding a preconfigured maximum distance from the operator. In some examples, the criteria may be selectively alterable. For example, different criteria may be set for particular flights or aerial vehicles, such as in locations with airspace restrictions, or with known obstacles or a higher likelihood of potential conflicts.

In some methods 200, the aerial vehicle may be configured to be controlled by user command signals generated by a remotely positioned ground control station (e.g., ground control station 24) operated by an operator positioned remotely from the aerial vehicle. For example, the aerial vehicle may be an unmanned aerial vehicle (UAV). Additionally or alternatively, the aerial vehicle may be autonomous (and/or have an autonomous mode) in some methods 200.

In some examples, methods 200 include communicating to an operator of the aerial vehicle at 212, such as with information regarding a deviating condition detected at 206. For example, the processing unit may be configured to communicate to an operator at 212 after detecting a deviating condition at 206, and may provide information such as the first and second situational data sets, recommended actions to mitigate the deviating condition, a projected time period in which to act on the deviating condition, and/or a distance between the aerial vehicle and a respective potential conflict. In some examples, the processing unit may trigger a contingency maneuver at 208 substantially simultaneously with communicating with the operator. In some examples, the processing unit may trigger a contingency maneuver at 208 only after communicating the deviating condition to the operator at 212. For example, the processing unit may be configured to wait a predetermined amount of time at 214, after communicating the deviating condition to the operator at 212, before triggering the contingency maneuver at 208. In this manner, the disclosed system may be configured to provide an opportunity for an operator to manually mitigate the deviating condition, before the system would automatically trigger the contingency maneuver (e.g., if the operator did not take action quickly enough, or did not take sufficient action to mitigate the deviating condition during the predetermined amount of time). In such cases, the processing unit may be configured to continue to monitor the deviating condition during the waiting the predetermined amount of time at 214. For example, while waiting at 214, the processing unit may update the second situational data set of the potential conflict at 210 and re-compare the first and second situational data sets at 204, to monitor whether the deviating condition still exists, or whether it has been mitigated. If, however, the operator takes sufficient action within the predetermined amount of time to avoid the potential conflict and/or eliminate the deviating condition, then the processing unit would not trigger the contingency maneuver at 208.

In some examples, triggering a contingency maneuver at 208 includes interrupting, attenuating, and/or preventing user command signals after a deviating condition is detected at 206. For example, disclosed systems may be configured to render user command signals (received after detecting a deviating condition at 206) weaker and/or less effective than they would be otherwise, and continue doing so until there is no longer a detected deviating condition. Additionally or alternatively, the processing unit may prevent at least certain user command signals from being carried out by the aerial vehicle. In this manner, disclosed systems are said to override, or take priority over, user command signals, thus automatically ensuring that the deviating condition is mitigated, without risk of an operator taking action to prevent such mitigation. In some examples, the processing unit may be configured to permit operator control if the user command signals are configured to mitigate the deviating condition, while preventing, interrupting, and/or attenuating any user command signals that may introduce a new deviating condition or make a current deviating condition worse. In some examples, user command signals may be attenuated to a varying degree by the processing unit, such as in proportion to a distance between the aerial vehicle and a respective potential conflict, and/or in proportion to a speed of the aerial vehicle. For example, the processing unit may be configured to attenuate a user command signal to a greater degree, the closer the aerial vehicle gets to a potential conflict, or the faster the aerial vehicle is traveling.

Illustrative, non-exclusive examples of inventive subject matter according to the present disclosure are described in the following enumerated paragraphs:

A1. A method causing an aerial vehicle to perform a contingency maneuver, wherein the aerial vehicle is configured to be controlled by user command signals generated by a remotely positioned ground control station operated by an operator positioned remotely from the aerial vehicle, or wherein the aerial vehicle is autonomous, wherein the aerial vehicle comprises a navigation system configured to receive air traffic signals, the method comprising:

identifying a first situational data set of the aerial vehicle by receiving sensor data via a sensor on board the aerial vehicle while the aerial vehicle is in-flight, wherein the identifying the first situational data set is performed by at least one processing unit on board the aerial vehicle, wherein the receiving the sensor data comprises receiving global positioning system (GPS) data, and wherein the sensor is configured to communicate the sensor data to the at least one processing unit;

comparing the first situational data set to a second situational data set via the at least one processing unit;

detecting a deviating condition as a result of the comparing the first situational data set to the second situational data set, wherein the detecting the deviating condition is performed by the at least one processing unit, and wherein at least one criteria for the deviating condition is stored on non-transitory computer readable memory of the aerial vehicle; and triggering activation of the contingency maneuver in response to the deviating condition, wherein the triggering activation is performed by the at least one processing unit without external input, and wherein the contingency maneuver mitigates the deviating condition.

A1.1 The method of paragraph A1, wherein the detecting the deviating condition comprises detecting a potential conflict within a predetermined radius of the aerial vehicle.

A1.2. The method of paragraph A1.1, wherein the second situational data set comprises information regarding an altitude, a speed, a size, a relative location, and/or a direction of travel of the potential conflict.

A1.3. The method of any of paragraphs A1.1 or A1.2, wherein the triggering activation of the contingency maneuver comprises triggering activation in response to the detecting the potential conflict.

A1.4. The method of any of paragraphs A1.1-A1.3, wherein the contingency maneuver alters the position of the aerial vehicle relative to the potential conflict.

A1.5. The method of any of paragraphs A1.1-A1.4, wherein the contingency maneuver alters an altitude of the aerial vehicle, a speed of the aerial vehicle, a location of the aerial vehicle, a relative location of the aerial vehicle relative to a/the potential conflict, and/or a direction of travel of the aerial vehicle, thereby mitigating the deviating condition and/or avoiding contact between the aerial vehicle and the potential conflict.

A1.6. The method of any of paragraphs A1-A1.5, wherein the contingency maneuver shuts down power to the aerial vehicle, causes the aerial vehicle to fly to a predetermined location, causes the aerial vehicle to return to a base, and/or causes the aerial vehicle to return to a waypoint.

A1.7. The method of any of paragraphs A1-A1.6, wherein the navigation system comprises an automatic dependent surveillance-broadcast messaging receiver configured to receive automatic dependent surveillance-broadcast signals.

A2. The method of any of paragraphs A1-A1.7, wherein the aerial vehicle comprises an unmanned aerial vehicle (UAV) configured to be controlled by user command signals generated by a remotely positioned ground control station operated by an operator positioned remotely from the UAV, the method further comprising communicating to the operator of the aerial vehicle with information regarding the deviating condition.

A3. The method of paragraph A2, wherein the communicating the deviating condition to the operator is initiated by the at least one processing unit prior to the triggering activation of the contingency maneuver.

A4. The method of paragraph A2 or A3, further comprising waiting a predetermined amount of time between the communicating to the operator and the triggering activation of the contingency maneuver.

A5. The method of paragraph A4, further comprising monitoring the condition during the predetermined amount of time, wherein the monitoring the condition is performed by the at least one processing unit, and wherein the triggering activation of the contingency maneuver is not performed if the operator takes sufficient action within the predetermined amount of time to avoid a/the potential conflict and/or to eliminate the deviating condition.

A6. The method of any of paragraphs A1-A5, further comprising attenuating a respective user command signal received by the aerial vehicle from the operator of the aerial vehicle after the detecting the deviating condition, such that the respective user command signal is weaker and less effective than it would be otherwise, wherein the attenuating is performed by the at least one processing unit.

A6.1. The method of paragraph A6, wherein the attenuating is performed until there is no longer a detected deviating condition.

A7. The method of any of paragraphs A1-A6.1, further comprising interrupting any user command signals transmitted by the operator after the detecting the deviating condition.

A7.1. The method of paragraph of A7, wherein the interrupting any user command signals comprises preventing the user command signals from being carried out by the aerial vehicle.

A7.2. The method of paragraph A7, wherein the interrupting any user command signals comprises attenuating any user command signals from the ground control station once the at least one processing unit triggers the contingency maneuver.

A7.3. The method of paragraph A7.2, wherein the attenuating any user command signals comprises attenuating the user command signals to a varying degree, in proportion to a distance between the aerial vehicle and a respective potential conflict.

A7.4. The method of any of paragraphs A7-A7.3, wherein the interrupting is initiated by the at least one processing unit and performed until there is no longer a detected deviating condition.

A8. The method of any of paragraphs A1-A7.4, further comprising preventing receipt by the aerial vehicle of any user command signals that are transmitted by the operator after the detecting the deviating condition, such that the user command signals are not carried out by the aerial vehicle, wherein the preventing is initiated by the at least one processing unit.

A8.1. The method of paragraph A8, wherein the preventing is performed until there is no longer a detected deviating condition.

A9. The method of any of paragraphs A1-A8.1, wherein the identifying the first situational data set comprises receiving global positioning system (GPS) data, radar data, and/or automatic dependent surveillance-broadcast (ADS-B) data (ADS-B In messages).

A9.1. The method of any of paragraphs A1-A9, wherein the identifying the first situational data set comprises determining an altitude, a speed, a size, a relative location, and/or a direction of travel of the aerial vehicle.

A10. The method of any of paragraphs A1-A9.1, wherein the sensor comprises a universal access transceiver (UAT), a GPS receiver, and/or an ADS-B In system.

A10.1. The method of any of paragraphs A1-A10, wherein the sensor is configured to compile and transmit ADS-B Out messages, and further configured to receive and store ADS-B In messages.

A10.2. The method of any of paragraphs A1-A10.1, wherein the sensor is configured to communicate the sensor data to the at least one processing unit.

A10.3. The method of any of paragraphs A1-A10.2, wherein the aerial vehicle includes a memory storing non-transitory computer readable instructions that, when executed by the at least one processing unit, cause the at least one processing unit to store the sensor data.

A11. The method of any of paragraphs A1-A10.3, further comprising configuring the at least one processing unit with the at least one criteria, wherein the at least one criteria is selectively alterable.

A11.1. The method of any of paragraphs A1-A11, wherein the second situational data set is stored on the non-transitory computer readable memory of the aerial vehicle.

A12. The method of any of paragraphs A1-A11.1, wherein the second situational data set comprises at least one selected from the group consisting of a maximum altitude of the aerial vehicle, a maximum speed of the aerial vehicle, a minimum distance from a known or detected obstacle, and a maximum distance from a base of the aerial vehicle.

A12.1. The method of any of paragraphs A1.1-A12, wherein the at least one criteria comprises a minimum distance between the aerial vehicle and any potential conflict.

A12.2. The method of any of paragraphs A11-A11, wherein the second situational data set is a situational data set of a potential conflict, wherein the method further comprises identifying the second situational data set of the potential conflict by receiving an automatic dependent surveillance-broadcast signal from the potential conflict via an/the automatic dependent surveillance-broadcast messaging receiver, and wherein the contingency maneuver prevents contact between the aerial vehicle and the potential conflict.

A12.3. The method of paragraph A12.2, wherein the first situational data set comprises at least one selected from the group consisting of a first location of the aerial vehicle, a first speed of the aerial vehicle, and a first altitude of the aerial vehicle, and wherein the second situational data set comprises at least one selected from the group consisting of a second location of the potential conflict, a second speed of the potential conflict, and a second altitude of the potential conflict.

A13. The method of any of paragraphs A1-A12.3, wherein a/the potential conflict comprises a second aerial vehicle, a manned aircraft, a balloon, a skydiver, a parachutist, a paraglider, and/or an animal.

A14. The method of any of paragraphs A1-A13, further comprising triggering activation of the contingency maneuver in response to the aerial vehicle exceeding a preconfigured maximum altitude and/or in response to the aerial vehicle exceeding a preconfigured maximum distance from the operator, wherein the triggering is performed by the at least one processing unit.

A15. The method of any of paragraphs A1-A14, wherein the triggering activation of the contingency maneuver comprises interrupting a main propulsion battery feed on board the aerial vehicle, interrupting power to a flight control computer on board the aerial vehicle, interrupting a speed controller signal configured to control a speed of the aerial vehicle, activating a control surface coupled to the aerial vehicle by transitioning the control surface from a first configuration to a second configuration, terminating flight of the aerial vehicle, causing the aerial vehicle to lose altitude, initiating a fly-home maneuver of the aerial vehicle, triggering an emergency landing maneuver of the aerial vehicle, and/or triggering a low-battery mode of the aerial vehicle.

A15.1. The method of paragraph A15, wherein the triggering activation of the contingency maneuver comprises activating a switch on board the aerial vehicle, wherein the switch is configured to interrupt a main propulsion battery feed on board the aerial vehicle, interrupt power to a flight control computer on board the aerial vehicle, interrupt a speed controller signal configured to control a speed of the aerial vehicle, activate a control surface coupled to the aerial vehicle by transitioning the control surface from a first configuration to a second configuration, terminate flight of the aerial vehicle, cause the aerial vehicle to lose altitude, initiate a fly-home maneuver of the aerial vehicle, trigger an emergency landing maneuver of the aerial vehicle, and/or trigger a low-battery mode of the aerial vehicle.

A16. The method of paragraph A15.1, wherein the switch comprises an electronic switch, an electromechanical switch, a MOSFET switch, and/or a solid state switch.

A17. The method of any of paragraphs A1-A16, wherein the triggering activation of the contingency maneuver comprises interrupting a main propulsion battery feed on board the aerial vehicle, wherein the main propulsion battery feed is configured to deliver power from an on-board battery to a propulsion motor on-board the aerial vehicle, wherein the interrupting is performed by the at least one processing unit.

A18. The method of paragraph A17, wherein the interrupting the main propulsion battery feed comprises preventing the propulsion motor from receiving power from the on-board battery, wherein the preventing is performed by the at least one processing unit.

A19. The method of paragraph A17, wherein the interrupting the main propulsion battery feed comprises reducing an amount of power received by the propulsion motor from the on-board battery, wherein the reducing is performed by the at least one processing unit.

A20. The method of any of paragraphs A1-A19, wherein the triggering activation of the contingency maneuver comprises interrupting power to a flight control computer on board the aerial vehicle, wherein the flight control computer is configured to actuate a throttle of the aerial vehicle, control a speed of the aerial vehicle, control an altitude of the aerial vehicle, control a pitch of the aerial vehicle, control the heading of the aerial vehicle, control a climb rate of the aerial vehicle, control a descent rate of the aerial vehicle, control a bank angle of the aerial vehicle, and/or control a turn rate of the aerial vehicle, wherein the interrupting power is performed by the at least one processing unit.

A21. The method of any of paragraphs A1-A20, wherein the triggering activation of the contingency maneuver comprises interrupting a speed controller signal configured to control a speed of the aerial vehicle, wherein the interrupting the speed controller signal is performed by the at least one processing unit.

A22. The method of paragraph A21, wherein the interrupting the speed controller signal comprises modifying a pulse-width modulated (PWM) signal, thereby reducing thrust to the aerial vehicle and/or causing the aerial vehicle to descend.

A23. The method of paragraph A21, wherein the interrupting the speed controller signal comprises modifying or disconnecting serial BUS traffic.

A24. The method of any of paragraphs A1-A23, wherein the triggering activation of the contingency maneuver comprises activating a control surface by transitioning the control surface from a first configuration to a second configuration, wherein the control surface is coupled to the aerial vehicle and configured to interrupt the flight path of the aerial vehicle when activated, and wherein the activating the control surface is performed by the at least one processing unit.

A24.1. The method of paragraph A24, wherein the control surface is configured to reduce thrust of the aerial vehicle when the control surface is in the second configuration.

A24.2. The method of any of paragraphs A1-A24.1, wherein the triggering activation of the contingency maneuver comprises terminating flight of the aerial vehicle, via the at least one processing unit.

A24.3. The method of any of paragraphs A1-A24.2, wherein the triggering activation of the contingency maneuver comprises causing the aerial vehicle to lose altitude, via the at least one processing unit.

A24.4. The method of any of paragraphs A1-A24.3, wherein the triggering activation of the contingency maneuver comprises initiating a fly-home maneuver of the aerial vehicle, via the at least one processing unit.

A24.5. The method of any of paragraphs A1-A24.4, wherein the triggering activation of the contingency maneuver comprises triggering an emergency landing maneuver of the aerial vehicle, via the at least one processing unit.

A24.6. The method of any of paragraphs A1-A24.5, wherein the triggering activation of the contingency maneuver comprises triggering a low-battery mode of the aerial vehicle, via the at least one processing unit.

A25. The method of any of paragraphs A1-A24.6, further comprising creating a virtual situational awareness of the aerial vehicle and a/the potential conflict, wherein the creating the virtual situational awareness is performed by the at least one processing unit, and wherein the virtual situational awareness includes a latitude of the aerial vehicle, a latitude of the potential conflict, a longitude of the aerial vehicle, a longitude of the potential conflict, a speed of the aerial vehicle, a speed of the potential conflict, an altitude of the aerial vehicle, and/or an altitude of the potential conflict.

A25.1. The method of paragraph A25, wherein the creating the virtual situational awareness comprises creating a virtual situational awareness of any potential conflict within a predetermined radius of the aerial vehicle.

A26. The method of paragraph A25 or A25.1, further comprising updating the virtual situational awareness at least 0.1 second intervals, at least 0.5 second intervals, at least 1 second intervals, at least 2 second intervals, at least 3 second intervals, and/or at least 5 second intervals.

A27. The method of any of paragraphs A1-A26, further comprising causing the aerial vehicle to descend to maintain a minimum predetermined distance from a/the potential conflict, via the at least one processing unit.

B1. A processing unit configured to be positioned on-board an aerial vehicle, the processing unit comprising:
a memory storing non-transitory computer readable instructions that, when executed by the processing unit, cause the processing unit to:
receive sensor data from a sensor on-board the aerial vehicle;
identify a first situational data set of the aerial vehicle via the sensor data;
compare the first situational data set to a second situational data set; and
trigger activation of a contingency maneuver when at least one processing unit detects a deviating condition as a result of comparing the first situational data set to the second situational data set, wherein criteria for the deviating condition are stored on the memory, wherein the contingency maneuver mitigates the deviating condition without external input, and wherein the instructions cause the at least one processing unit to automatically trigger the contingency maneuver in response to detecting the deviating condition.

B1.1. The processing unit of paragraph B1, wherein the contingency maneuver alters an altitude of the aerial vehicle, a speed of the aerial vehicle, a location of the aerial vehicle, and/or a direction of travel of the aerial vehicle, thereby altering and/or terminating the flight path of the aerial vehicle.

B1.2. The processing unit of paragraph B1 or B1.1, wherein the second situational data set is stored on the memory.

B1.3. The processing unit of paragraph B1 or B1.1, wherein the second situational data set is a situational data set of a potential conflict, and wherein the instructions, when executed by the processing unit, cause the processing unit to identify the second situational data set based on one or more air traffic signals received by receiver navigation system on board the aerial vehicle.

B1.4. The processing unit of paragraph B1.3, wherein the second situational data set comprises one or more selected from the group consisting of a second location of the potential conflict, a second speed of the potential conflict, and a second altitude of the potential conflict.

B1.5. The processing unit of paragraph B1.3 or B1.4, wherein the processing unit is configured to record a respective second situational data set regarding a position of any respective potential conflicts located within a predetermined radius surrounding the aerial vehicle, and wherein the instructions, when executed by the at least one processing unit, cause the at least one processing unit to:
determine the position of the aerial vehicle relative to any respective potential conflict based on air traffic signals;
create a virtual situational awareness of the aerial vehicle relative to any potential conflicts within a predetermined radius of the aerial vehicle; and
cause the at least one processing unit to update the virtual situational awareness at least once per second.

B1.6. The processing unit of any of paragraphs B1-B1.5, wherein the first situational data set comprises one or more selected from the group consisting of a first location of the aerial vehicle, a first speed of the aerial vehicle, and a first altitude of the aerial vehicle.

B2. The processing unit of any of paragraphs B1-B1.6, wherein the processing unit is configured to interface with a common element with which a flight controller of the aerial vehicle interfaces, wherein the flight controller is configured to control a flight path of the aerial vehicle.

B3. The processing unit of paragraph B2, wherein the common element comprises a propulsion battery pack, an electric propulsion motor, and/or a speed controller of the aerial vehicle.

B4. The processing unit of any of paragraphs B1-B3, wherein the instructions, when executed by the processing unit, cause the processing unit to communicate the deviating condition to a ground control station operated by an operator positioned remotely from the aerial vehicle, and wherein the instructions cause the processing unit to activate the contingency maneuver after waiting a predetermined period of time for a user command signal generated by the ground control station to remove the deviating condition and after determining that the deviating condition still exists after the predetermined period of time.

B4.1. The processing unit of any of paragraphs B1-B4, wherein the instructions, when executed by the processing unit, cause the processing unit to attenuate any user command signals from the ground control station once the processing unit triggers the contingency maneuver, and wherein the processing unit is configured to attenuate the user command signals to a varying degree, in proportion to a distance between the aerial vehicle and a respective potential conflict.

B5. The processing unit of any of paragraphs B1-B4.1, wherein the processing unit is a stand-alone processing unit configured to be retrofit into the aerial vehicle.

B6. The processing unit of any of paragraphs B1-B5, wherein the processing unit is configured to be integrated into the aerial vehicle at time of manufacture.

B7. The processing unit of any of paragraphs B1-B6, wherein the processing unit is powered by a dedicated battery on-board the aerial vehicle.

B8. The processing unit of any of paragraphs B1-B6, wherein the processing unit is configured to be powered by an aerial vehicle battery on-board the aerial vehicle, wherein the aerial vehicle battery powers one or more additional components on the aerial vehicle.

B9. The processing unit of any of paragraphs B1-B8, wherein the criteria comprises exceeding a maximum absolute altitude of the aerial vehicle, subceeding a minimum distance between the aerial vehicle and any potential conflict, exceeding a maximum closing speed of a potential conflict headed towards the aerial vehicle, and/or exceeding a preconfigured maximum distance from the operator.

B9.1. The processing unit of any of paragraphs B1-B9, wherein the second situational data set comprises a maximum absolute altitude of the aerial vehicle, a minimum distance of the aerial vehicle from a potential conflict, and/or a maximum distance of the aerial vehicle from an/the operator.

B10. The processing unit of any of paragraphs B1-B9.1, wherein the deviating condition comprises a potential conflict detected within 100 feet, within 200 feet, within 300 feet, within 400 feet, and/or within 500 feet of the aerial vehicle.

B11. The processing unit of any of paragraphs B9-B10, wherein the instructions, when executed by the processing unit, cause the processing unit to selectively scale the criteria in response to a current speed of the aerial vehicle.

B12. The processing unit of any of paragraphs B1-B11, wherein the processing unit is configured to receive signals from a local ADS-B receiver onboard the aerial vehicle and/or from a local GPS receiver on-board the aerial vehicle regarding a position of any potential conflicts located within the predetermined radius surrounding the aerial vehicle, a velocity of any such potential conflicts, and/or a direction of travel of any such potential conflicts.

B13. The processing unit of any of paragraphs B1-B12, wherein the instructions, when executed by the processing unit, cause the processing unit to determine the position of the aerial vehicle relative to an external ADS-B transmitter positioned on an aircraft other than the aerial vehicle, based on signals received from the external ADS-B transmitter.

B14. The processing unit of any of paragraphs B1-B13, wherein the processing unit is configured to receive input from a/the local ADS-B receiver on-board the aerial vehicle and/or from a/the local GPS receiver on-board the aerial vehicle regarding a position of the aerial vehicle, a velocity of the aerial vehicle, and/or a direction of travel of the aerial vehicle.

B15. The processing unit of any of paragraphs B1-B14, wherein the instructions, when executed by the processing unit, cause the processing unit to create a virtual situational awareness of the aerial vehicle relative to any potential conflicts within the predetermined radius of the aerial vehicle.

B15.1. The processing unit of paragraph B15, wherein the virtual situational awareness includes a latitude of the aerial vehicle, a latitude of the potential conflict, a longitude of the aerial vehicle, a longitude of the potential conflict, a speed of the aerial vehicle, a speed of the potential conflict, an altitude of the aerial vehicle, and/or an altitude of the potential conflict.

B15.2. The processing unit of paragraph B15 or B15.1, wherein the instructions, when executed by the processing unit, cause the processing unit to update the virtual situational awareness at least 0.1 second intervals, at least 0.5 second intervals, at least 1 second intervals, at least 2 second intervals, at least 3 second intervals, and/or at least 5 second intervals.

B16. The processing unit of any of paragraphs B1-B15.2, wherein the instructions, when executed by the processing unit, cause the processing unit to trigger the contingency maneuver by interrupting a main propulsion battery feed to a speed controller, a flight control computer, and/or a motor of the aerial vehicle.

B16.1. The processing unit of paragraph B16, wherein the main propulsion battery feed is configured to deliver power from an on-board battery to a propulsion motor on-board the aerial vehicle.

B16.2. The processing unit of paragraph B16 or B16.1, wherein the instructions, when executed by the processing unit, cause the processing unit to trigger the contingency maneuver by preventing the propulsion motor from receiving power from the on-board battery.

B16.3. The processing unit of paragraph B16 or B16.1, wherein the instructions, when executed by the processing unit, cause the processing unit to trigger the contingency maneuver by reducing an amount of power received by the propulsion motor from the on-board battery.

B16.4. The processing unit of any of paragraphs B1-B16.3, wherein the instructions, when executed by the processing unit, cause the processing unit to trigger the contingency maneuver by interrupting power to a flight control computer on board the aerial vehicle, wherein the flight control computer is configured to actuate a throttle of the aerial vehicle, control a speed of the aerial vehicle, control an altitude of the aerial vehicle, control a pitch of the aerial vehicle, control a heading of the aerial vehicle, control a climb rate of the aerial vehicle, control a descent rate of the aerial vehicle, control a bank angle of the aerial vehicle, and/or control a turn rate of the aerial vehicle.

B17. The processing unit of any of paragraphs B1-B16.4, wherein the instructions, when executed by the processing unit, cause the processing unit to trigger the contingency maneuver by disconnecting power to the aerial vehicle.

B18. The processing unit of any of paragraphs B1-B17, wherein the instructions, when executed by the processing unit, cause the processing unit to trigger the contingency maneuver by terminating flight of the aerial vehicle.

B19. The processing unit of any of paragraphs B1-B18, wherein the instructions, when executed by the processing unit, cause the processing unit to trigger the contingency maneuver by reducing power to the aerial vehicle such that the aerial vehicle loses altitude and/or starts a fly-home maneuver due to low voltage.

B20. The processing unit of any of paragraphs B1-B19, wherein the instructions, when executed by the processing unit, cause the processing unit to trigger the contingency maneuver by triggering the aerial vehicle to perform an emergency landing.

B20.1. The processing unit of any of paragraphs B1-B20, wherein the instructions, when executed by the processing unit, cause the processing unit to trigger the contingency maneuver by triggering a low-battery mode of the aerial vehicle.

B21. The processing unit of any of paragraphs B1-B20.1, wherein the instructions, when executed by the processing unit, cause the processing unit to trigger the contingency maneuver by interrupting and/or modifying a speed controller throttle signal configured to control a throttle of the aerial vehicle, thereby reducing thrust to the aerial vehicle and/or causing descent of the aerial vehicle.

B22. The processing unit of any of paragraphs B1-B21, wherein the instructions, when executed by the processing unit, cause the processing unit to trigger the contingency maneuver by interrupting and/or modifying a PWM signal and/or by interrupting and/or modifying serial traffic, thereby modifying a speed controller signal received by a/the speed controller of the aerial vehicle, wherein the speed controller signal is configured to control the speed of the aerial vehicle.

B23. The processing unit of any of paragraphs B1-B22, wherein the instructions, when executed by the processing unit, cause the processing unit to trigger the contingency maneuver by activating a control surface that spoils some of the aerial vehicle's thrust.

B24. The processing unit of any of paragraphs B1-B23, wherein the processing unit is configured to be positioned on-board an unmanned aerial vehicle (UAV).

C1. A method, comprising:
configuring an aerial vehicle to automatically perform a contingency maneuver without external input, in response to a detected deviating condition, wherein at least one criteria for the deviating condition is stored on non-transitory computer readable memory of the aerial vehicle.

C2. The method of paragraph C1, wherein the configuring comprises retrofitting an existing aerial vehicle with the processing unit of any of paragraphs B1-B23.

C3. The method of paragraph C1 or C2, wherein the aerial vehicle comprises an unmanned aerial vehicle (UAV), and wherein the configuring comprises configuring the UAV to automatically perform the contingency maneuver without input from an operator of the UAV, in response to a detected deviating condition.

D1. An aerial vehicle, comprising:
a navigation system on board the aerial vehicle, wherein the navigation system comprises a sensor configured to record and/or receive sensor data while the aerial vehicle is in flight, and wherein
the navigation system is configured to receive air traffic signals; and
the processing unit of any of paragraphs B1-B23.

D1.1. The aerial vehicle of paragraph D1, wherein the aerial vehicle is configured to be controlled by user command signals generated by a remotely-positioned ground control station operated by an operator positioned remotely from the aerial vehicle.

D1.2. The aerial vehicle of paragraph D1, wherein the aerial vehicle is autonomous.

D1.3. The aerial vehicle of any of paragraphs D1-D1.2, wherein the aerial vehicle is an unmanned aerial vehicle (UAV).

D2. The aerial vehicle of any of paragraphs D1-D1.3, wherein the sensor comprises a GPS receiver, a GPS transmitter, a GPS transceiver, and/or a radio receiver.

D2.1. The aerial vehicle of any of paragraphs D1-D2, wherein the navigation system comprises an ADS-B receiver configured to receive ADS-B In communications, an ADS-B transmitter configured to transmit ADS-B Out communications, and/or a universal access transceiver (UAT).

D3. The aerial vehicle of any of paragraphs D1-D2.1, further comprising an emergency landing system configured to reduce or prevent damage to the aerial vehicle in the event that the contingency maneuver is triggered.

D4. The aerial vehicle of paragraph D3, wherein the emergency landing system comprises a parachute and/or a shock attenuator.

D4.1. The aerial vehicle of any of paragraphs D1-D4, further comprising a descent stabilizer configured to slow a descent of the aerial vehicle and/or cushion a descent impact of the aerial vehicle, wherein the descent stabilizer comprises at least one selected from the group consisting of a parachute, a foam structure, an air bag, and a spring.

D5. The aerial vehicle of any of paragraphs D1-D4.1, wherein the navigation system is configured to detect and/or receive information regarding any potential conflict that comes within a predetermined threshold distance from the aerial vehicle.

D6. The aerial vehicle of paragraph D5, wherein the potential conflict comprises a second aerial vehicle and/or a manned aircraft.

D7. The aerial vehicle of any of paragraphs D1-D6, wherein the aerial vehicle comprises a multicopter (also referred to as a multi-rotor), a fixed-wing aerial vehicle, a single-rotor (also referred to as a helicopter) aerial vehicle, and/or a fixed-wing hybrid aerial vehicle.

D8. The aerial vehicle of any of paragraphs D1-D7, further comprising a switch on-board the aerial vehicle, wherein the instructions, when executed by the processing unit, cause the processing unit to activate the switch to trigger the contingency maneuver.

D8.1. The aerial vehicle of paragraph D8, wherein the switch, when activated, is configured to interrupt a main propulsion battery feed to a speed controller, a flight control computer, and/or a motor of the aerial vehicle, and wherein the main propulsion battery feed is configured to deliver power from an on-board battery to a propulsion motor on-board the aerial vehicle.

D8.2. The aerial vehicle of paragraph D8 or D8.1, wherein the switch, when activated, is configured to interrupt power to a flight control computer on board the aerial vehicle, and wherein the flight control computer is configured to actuate a throttle of the aerial vehicle, control a speed of the aerial vehicle, control an altitude of the aerial vehicle, control a pitch of the aerial vehicle, control a heading of the aerial vehicle, control a climb rate of the aerial vehicle, control a descent rate of the aerial vehicle, control a bank angle of the aerial vehicle, and/or control a turn rate of the aerial vehicle.

D8.3. The aerial vehicle of any of paragraphs D8-D8.2, wherein the switch, when activated is configured to terminate flight of the aerial vehicle.

D8.4. The aerial vehicle of any of paragraphs D8-D8.3, wherein the switch, when activated is configured to actuate a control surface that spoils some of the aerial vehicle's thrust.

D9. The aerial vehicle of any of paragraphs D8-D8.4, wherein the switch comprises an electronic switch, an electromechanical switch, a MOSFET switch, and/or a solid state switch.

D10. The aerial vehicle of any of paragraphs D1-D9, further comprising a plurality of switches, each respective switch being configured to modify and/or terminate a different respective portion of the aerial vehicle.

D11. The aerial vehicle of any of paragraphs D1-D10, wherein the instructions, when executed by the processing unit, cause the processing unit to detect a/the potential conflict and/or the deviating condition via comparing the first situational data set based on the sensor data to the second situational data set.

D12. The aerial vehicle of paragraph D11, wherein the second situational data set comprises information regarding an altitude, a speed, a size, a relative location, and/or a direction of travel of the potential conflict.

D12.1. The aerial vehicle of paragraph D11, wherein the second situational data set comprises an absolute maximum altitude of the aerial vehicle and/or a maximum distance of the aerial vehicle from an/the operator of the aerial vehicle.

D13. The aerial vehicle of any of paragraphs D11-D12.1, wherein the instructions, when executed by the processing unit, cause the processing unit to trigger activation of the contingency maneuver in response to the potential conflict and/or the deviating condition.

D14. The aerial vehicle of any of paragraphs D11-D13, wherein the instructions, when executed by the processing unit, cause the processing unit to alter the position of the aerial vehicle relative to the potential conflict.

D15. The aerial vehicle of any of paragraphs D11-D14, wherein the instructions, when executed by the processing unit, cause the processing unit to alter an altitude of the aerial vehicle, a speed of the aerial vehicle, a location of the aerial vehicle, a relative location of the aerial vehicle relative to the potential conflict, and/or a direction of travel of the aerial vehicle, thereby avoiding contact between the aerial vehicle and the potential conflict.

D16. The aerial vehicle of any of paragraphs D11-D15, wherein the instructions, when executed by the processing unit, cause the processing unit to transmit information regarding the potential conflict to a/the ground control station.

D17. The aerial vehicle of paragraph D16, wherein the instructions, when executed by the processing unit, cause the processing unit to wait a predetermined amount of time between detecting the potential conflict and transmitting the information regarding the potential conflict to the ground control station.

D18. The aerial vehicle of any of paragraphs D11-D17, wherein the instructions, when executed by the processing unit, cause the processing unit to attenuate a respective user command signal received by the aerial vehicle from a/the ground control station after the processing unit detects the potential conflict, such that the respective user command signal is weaker and less effective than it would be otherwise.

D19. The aerial vehicle of any of paragraphs D11-D18, wherein the instructions, when executed by the processing unit, cause the processing unit to interrupt any user command signals received by the aerial vehicle from a/the ground control station after the processing unit detects the potential conflict, such that the user command signals are not carried out by the aerial vehicle.

D20. The aerial vehicle of any of paragraphs D11-D19, wherein the instructions, when executed by the processing unit, cause the processing unit to prevent receipt by the aerial vehicle of any user command signals transmitted from a/the ground control station after the processing unit detects the potential conflict, such that the user command signals are not carried out by the aerial vehicle.

D20.1. The aerial vehicle of any of paragraphs D11-D20, wherein the potential conflict comprises a second aerial vehicle, a manned aircraft, a balloon, a skydiver, a parachutist, a paraglider, and/or an animal.

D21. The aerial vehicle of any of paragraphs D1-D20.1, wherein the sensor is configured to receive information regarding an altitude, a speed, a size, a relative location, and/or a direction of travel of the aerial vehicle.

D22. The aerial vehicle of any of paragraphs D1-D21, wherein the navigation system is configured to compile and transmit ADS-B Out messages, and further configured to receive and store ADS-B In messages.

D23. The aerial vehicle of any of paragraphs D1-D22, wherein the navigation system is configured to communicate the sensor data to the processing unit.

D24. The aerial vehicle of any of paragraphs D1-D23, wherein the instructions cause the processing unit to store the sensor data.

D25. The aerial vehicle of any of paragraphs D1-D24, wherein the criteria is stored on non-transitory computer readable memory of the aerial vehicle, wherein the criteria is selectively alterable.

D26. The aerial vehicle of any of paragraphs D1-D25, wherein the aerial vehicle comprises a flight control computer on board the aerial vehicle, wherein the flight control computer is configured to actuate a throttle of the aerial vehicle, control a speed of the aerial vehicle, control an altitude of the aerial vehicle, control a pitch of the aerial vehicle, control a heading of the aerial vehicle, control a climb rate of the aerial vehicle, control a descent rate of the aerial vehicle, control a bank angle of the aerial vehicle, and/or control a turn rate of the aerial vehicle.

D27. The aerial vehicle of any of paragraphs D1-D26, wherein the aerial vehicle comprises a control surface, wherein the control surface is configured to be selectively transitioned between a first configuration and a second configuration, wherein in the first configuration, the control surface is positioned and/or oriented to have a minimum impact on the flight path of the aerial vehicle, and wherein the second configuration, the control surface is positioned and/or oriented to have a maximum impact on the flight path of the aerial vehicle.

D28. The aerial vehicle of paragraph D27, wherein the instructions, when executed by the processing unit, cause the processing unit to trigger the contingency maneuver by activating the control surface by transitioning the control surface from the first configuration to the second configuration.

E1. An aerial environment, comprising:
the aerial vehicle of any of paragraphs D1-D28; and
a/the ground control station positioned remotely from the aerial vehicle, wherein the ground control station is configured to be operated by an operator to generate user command signals to control the aerial vehicle.

E2. The aerial environment of paragraph E1, wherein the ground control station comprises a radio transmitter on the ground, and wherein the navigation system is configured to receive user command signals from the radio transmitter.

E3. The aerial environment of paragraph E1 or E2, wherein the ground control station comprises a user interface configured to communicate information from the processing unit to the operator.

F1. The use of the processing unit of any of paragraphs B1-B24 to configure an aerial vehicle to automatically perform a contingency maneuver that alters an altitude of the aerial vehicle, a speed of the aerial vehicle, a location of the aerial vehicle, and/or a direction of travel of the aerial vehicle, without external input, thereby altering the flight path of the aerial vehicle, in response to a deviating condition detected by the processing unit.

G1. A computer readable medium, comprising:
non-transitory computer readable instructions that, when executed by a processing unit on-board a mobile vehicle, cause the processing unit to:
receive sensor data from a sensor on-board the mobile vehicle;
identify a first situational data set of the mobile vehicle, based on the sensor data;
compare the first situational data set to a second situational data set; and
trigger activation of a contingency maneuver that alters an altitude of the mobile vehicle, a speed of the mobile vehicle, a location of the mobile vehicle, and/or a direction of travel of the mobile vehicle, without external input, thereby altering and/or terminating the travel path of the mobile vehicle, wherein the instructions, when executed by the processing unit, cause the processing unit to automatically trigger the contingency maneuver in response to detecting a deviating condition, based on comparing the first situational data set to the second situational data set.

G2. The computer readable medium of paragraph G1, wherein the instructions, when executed by the processing unit, cause the processing unit to communicate the deviating condition to a remotely-positioned operator, and wherein the instructions, when executed by the processing unit, cause the processing unit to activate the contingency maneuver after waiting a predetermined period of time for a user command signal generated by the operator that removes the deviating condition and after determining that the deviating condition still exists after the predetermined period of time.

G3. The computer readable medium of any of paragraphs G1-G2, comprising a criteria for the deviating condition stored on the computer readable medium, wherein the instructions, when executed by the processing unit, cause the processing unit to selectively scale the criteria in response to a current speed of the mobile vehicle.

G4. The computer readable medium of any of paragraphs G1-G3, wherein the instructions, when executed by the processing unit, cause the processing unit to determine the position of the mobile vehicle relative to an external ADS-B transmitter positioned on a vehicle other than the mobile vehicle, based on signals received from the external ADS-B transmitter.

G5. The computer readable medium of any of paragraphs G1-G4, wherein the instructions, when executed by the processing unit, cause the processing unit to create a virtual situational awareness of the mobile vehicle relative to any potential conflicts within a predetermined radius of the mobile vehicle.

G6. The computer readable medium of paragraph G5, wherein the virtual situational awareness includes a latitude of the mobile vehicle, a latitude of the potential conflict, a longitude of the mobile vehicle, a longitude of the potential conflict, a speed of the mobile vehicle, a speed of the potential conflict, an altitude of the mobile vehicle, and/or an altitude of the potential conflict.

G7. The computer readable medium of any of paragraphs G5-G6, wherein the instructions, when executed by the processing unit, cause the processing unit to update the virtual situational awareness at least 0.1 second intervals, at least 0.5 second intervals, at least 1 second intervals, at least 2 second intervals, at least 3 second intervals, and/or at least 5 second intervals.

G8. The computer readable medium of any of paragraphs G1-G7, wherein the instructions, when executed by the processing unit, cause the processing unit to trigger the contingency maneuver by interrupting a main propulsion battery feed to a speed controller, a flight control computer, and/or a motor of the mobile vehicle.

G9. The computer readable medium of paragraph G8, wherein the main propulsion battery feed is configured to deliver power from an on-board battery to a propulsion motor on-board the mobile vehicle.

G10. The computer readable medium of any of paragraphs G8-G9, wherein the instructions, when executed by the processing unit, cause the processing unit to trigger the contingency maneuver by preventing the propulsion motor from receiving power from the on-board battery.

G11. The computer readable medium of any of paragraphs G8-G9, wherein the instructions, when executed by the processing unit, cause the processing unit to trigger the contingency maneuver by reducing an amount of power received by the propulsion motor from the on-board battery.

G12. The computer readable medium of any of paragraphs G1-G11, wherein the instructions, when executed by the processing unit, cause the processing unit to trigger the contingency maneuver by interrupting power to a/the flight control computer on board the mobile vehicle, wherein the flight control computer is configured to actuate a throttle of the mobile vehicle, control a speed of the mobile vehicle, control an altitude of the mobile vehicle, control a pitch of the mobile vehicle, control a heading of the mobile vehicle, control a climb rate of the mobile vehicle, control a descent rate of the mobile vehicle, control a bank angle of the mobile vehicle, and/or control a turn rate of the mobile vehicle.

G13. The computer readable medium of any of paragraphs G1-G12, wherein the instructions, when executed by the processing unit, cause the processing unit to trigger the contingency maneuver by disconnecting power to the mobile vehicle.

G14. The computer readable medium of any of paragraphs G1-G13, wherein the instructions, when executed by the processing unit, cause the processing unit to trigger the contingency maneuver by terminating travel of the mobile vehicle.

G15. The computer readable medium of any of paragraphs G1-G14, wherein the instructions, when executed by the processing unit, cause the processing unit to trigger the contingency maneuver by reducing power to the mobile vehicle such that the mobile vehicle loses altitude and/or starts a fly-home maneuver due to low voltage.

G16. The computer readable medium of any of paragraphs G1-G15, wherein the instructions, when executed by the processing unit, cause the processing unit to trigger the contingency maneuver by triggering the mobile vehicle to perform an emergency landing.

G17. The computer readable medium of any of paragraphs G1-G16, wherein the instructions, when executed by the processing unit, cause the processing unit to trigger the contingency maneuver by triggering a low-battery mode of the mobile vehicle.

G18. The computer readable medium of any of paragraphs G1-G17, wherein the instructions, when executed by the processing unit, cause the processing unit to trigger the contingency maneuver by interrupting and/or modifying a speed controller throttle signal configured to control a throttle of the mobile vehicle, thereby reducing thrust to the mobile vehicle and/or causing descent of the mobile vehicle.

G19. The computer readable medium of any of paragraphs G1-G18, wherein the instructions, when executed by the processing unit, cause the processing unit to trigger the contingency maneuver by interrupting and/or modifying a PWM signal and/or interrupting and/or modifying serial traffic, thereby modifying a speed controller signal received by a/the speed controller of the mobile vehicle, wherein the speed controller signal is configured to control the speed of the mobile vehicle.

G20. The computer readable medium of any of paragraphs G1-G19, wherein the instructions, when executed by the processing unit, cause the processing unit to trigger the contingency maneuver by activating a control surface that spoils some of the mobile vehicle's thrust.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

A processing unit and/or user interface may be any suitable device or devices that are configured to perform the functions of the processing unit/user interface discussed herein. For example, the processing unit and/or the user interface may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

Additionally or alternatively, the processing unit and/or the user interface may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of causing an aerial vehicle to perform a contingency maneuver, wherein the aerial vehicle comprises a navigation system configured to receive air traffic signals, the method comprising:

identifying a first situational data set of the aerial vehicle by receiving sensor data via a sensor on board the aerial vehicle while the aerial vehicle is in-flight, wherein the identifying the first situational data set is performed by at least one processing unit on board the aerial vehicle, and wherein the sensor is configured to communicate the sensor data to the at least one processing unit;

comparing the first situational data set to a second situational data set via the at least one processing unit;

detecting a deviating condition as a result of the comparing the first situational data set to the second situational data set, wherein the detecting the deviating condition is performed by the at least one processing unit, and wherein criteria for the deviating condition are stored on non-transitory computer readable memory of the aerial vehicle; and triggering activation of the contingency maneuver in response to the deviating condition, wherein the triggering activation is performed by the at least one processing unit without external input, wherein the contingency maneuver mitigates the deviating condition, and wherein the contingency maneuver causes at least one selected from the group consisting of altering an altitude of the aerial vehicle, altering a speed of the aerial vehicle, altering a location of the aerial vehicle, altering a relative location of the aerial vehicle relative to a potential conflict, altering a direction of travel of the aerial vehicle, shutting down power to the aerial vehicle, the aerial vehicle to fly to a predetermined location, the aerial vehicle to return to a base, and the aerial vehicle to return to a waypoint.

2. The method according to claim 1, wherein the second situational data set is a situational data set of a potential conflict, wherein the method further comprises identifying the second situational data set of the potential conflict by receiving air traffic signals from the potential conflict via the navigation system, and wherein the contingency maneuver prevents contact between the aerial vehicle and the potential conflict.

3. The method according to claim 2, wherein the first situational data set comprises at least one selected from the group consisting of a first location of the aerial vehicle, a first speed of the aerial vehicle, and a first altitude of the aerial vehicle, and wherein the second situational data set comprises at least one selected from the group consisting of a second location of the potential conflict, a second speed of the potential conflict, and a second altitude of the potential conflict.

4. The method according to claim 1, wherein the second situational data set comprises at least one selected from the group consisting of a maximum altitude of the aerial vehicle, a maximum speed of the aerial vehicle, a minimum distance from a known or detected obstacle, and a maximum distance from a base of the aerial vehicle, and wherein the second situational data set is stored on the non-transitory computer readable memory of the aerial vehicle.

5. The method according to claim 1, wherein the aerial vehicle comprises an unmanned aerial vehicle (UAV) configured to be controlled by user command signals generated by a remotely positioned ground control station operated by an operator positioned remotely from the UAV, the method further comprising:
communicating to the operator of the UAV with information regarding the deviating condition, wherein the communicating the deviating condition to the operator is initiated by the at least one processing unit prior to the triggering activation of the contingency maneuver;
waiting a predetermined amount of time between the communicating to the operator and the triggering activation of the contingency maneuver; and
monitoring the deviating condition during the predetermined amount of time, wherein the monitoring the deviating condition is performed by the at least one processing unit, and wherein the triggering activation of the contingency maneuver is not performed if the operator takes sufficient action within the predetermined amount of time to eliminate the deviating condition.

6. The method according to claim 5, further comprising interrupting any user command signals transmitted by the operator after the detecting the deviating condition, wherein the interrupting is initiated by the at least one processing unit and performed until the deviating condition is removed.

7. The method according to claim 1, wherein the triggering activation of the contingency maneuver comprises at least one selected from the group consisting of interrupting a main propulsion battery feed on board the aerial vehicle, interrupting power to a flight control computer on board the aerial vehicle, interrupting a speed controller signal configured to control a speed of the aerial vehicle, activating a control surface coupled to the aerial vehicle by transitioning the control surface from a first configuration to a second configuration, terminating flight of the aerial vehicle, causing the aerial vehicle to lose altitude, initiating a fly-home maneuver of the aerial vehicle, triggering an emergency landing maneuver of the aerial vehicle, and triggering a low-battery mode of the aerial vehicle.

8. The method according to claim 1, further comprising:
creating a virtual situational awareness of the aerial vehicle and any potential conflict within a predetermined radius of the aerial vehicle, wherein the creating the virtual situational awareness is performed by the at least one processing unit, and wherein the virtual situational awareness includes at least one selected from the group consisting of a latitude of the aerial vehicle, a latitude of the potential conflict, a longitude of the aerial vehicle, a longitude of the potential conflict, a speed of the aerial vehicle, a speed of the potential conflict, an altitude of the aerial vehicle, and an altitude of the potential conflict; and
updating the virtual situational awareness at least once per second.

9. A system, comprising:
an aerial vehicle;
a navigation system comprising a sensor on-board the aerial vehicle, wherein the sensor is configured to receive sensor data while the aerial vehicle is in flight, and wherein the navigation system is configured to receive air traffic signals;
at least one processing unit positioned on-board the aerial vehicle, wherein the at least one processing unit is configured to receive the sensor data from the sensor on-board the aerial vehicle, wherein the at least one processing unit is configured to identify a first situational data set of the aerial vehicle by receiving the sensor data via the sensor while the aerial vehicle is in-flight; and
a memory storing non-transitory computer readable instructions that, when executed by the at least one processing unit, cause the at least one processing unit to compare the first situational data set to a second situational data set and cause activation of a contingency maneuver when the at least one processing unit detects a deviating condition as a result of comparing the first situational data set to the second situational data set, wherein criteria for the deviating condition are stored on the memory, wherein the contingency maneuver mitigates the deviating condition without external input when the contingency maneuver is performed by the aerial vehicle, wherein the instructions cause the at least one processing unit to automatically trigger the contingency maneuver in response to detecting the deviating condition, and wherein the contingency maneuver causes at least one selected from the group consisting of altering an altitude of the aerial vehicle, altering a speed of the aerial vehicle, altering a location of the aerial vehicle, altering a relative location of the aerial vehicle relative to a potential conflict, altering a direction of travel of the aerial vehicle, shutting down power to the aerial vehicle, the aerial vehicle to fly to a predetermined location, the aerial vehicle to return to a base, and the aerial vehicle to return to a waypoint.

10. The system according to claim 9, wherein the first situational data set comprises one or more selected from the group consisting of a first location of the aerial vehicle, a first speed of the aerial vehicle, and a first altitude of the aerial vehicle.

11. The system according to claim 10, wherein the second situational data set is a situational data set of a potential conflict, wherein the at least one processing unit is configured to identify the second situational data set of the potential conflict by receiving the air traffic signals from the potential conflict via the navigation system while the aerial vehicle is in flight, and wherein the second situational data set comprises one or more selected from the group consisting of a second location of the potential conflict, a second speed of the potential conflict, and a second altitude of the potential conflict.

12. The system according to claim 11, wherein the at least one processing unit is configured to record a respective second situational data set regarding a position of any respective potential conflicts located within a predetermined radius surrounding the aerial vehicle, and wherein the instructions, when executed by the at least one processing unit, cause the at least one processing unit to:
determine the position of the aerial vehicle relative to any respective potential conflict based on the air traffic signals;
create a virtual situational awareness of the aerial vehicle relative to any potential conflicts within a predetermined radius of the aerial vehicle; and
cause the at least one processing unit to update the virtual situational awareness at least once per second.

13. The system according to claim 9, wherein the deviating condition comprises at least one selected from the group consisting of exceeding a maximum absolute altitude of the aerial vehicle, subceeding a minimum distance between the aerial vehicle and a respective potential conflict, a respective potential conflict headed towards the aerial vehicle with a closing speed exceeding a maximum closing speed, and exceeding a preconfigured maximum distance from a remotely positioned operator.

14. The system according to claim 9, wherein the instructions, when executed by the at least one processing unit, cause the at least one processing unit to selectively scale the criteria in response to a current speed of the aerial vehicle.

15. The system according to claim 9, wherein the instructions, when executed by the at least one processing unit, cause the at least one processing unit to trigger the contingency maneuver by interrupting a main propulsion battery feed to at least one selected from the group consisting of a speed controller, a flight control computer, and a motor of the aerial vehicle, and wherein the main propulsion battery feed is configured to deliver power from an on-board battery to a propulsion motor on-board the aerial vehicle such that at least one selected from the group consisting of an altitude of the aerial vehicle, a speed of the aerial vehicle, a location of the aerial vehicle, and a direction of travel of the aerial vehicle is altered by the contingency maneuver.

16. The system according to claim 9, wherein the instructions, when executed by the at least one processing unit, cause the at least one processing unit to trigger the contingency maneuver by interrupting power to a flight control computer on board the aerial vehicle, and wherein the flight control computer is configured to control at least one selected from the group consisting of a throttle of the aerial vehicle, a speed of the aerial vehicle, an altitude of the aerial vehicle, a pitch of the aerial vehicle, a heading of the aerial vehicle, a climb rate of the aerial vehicle, a descent rate of the aerial vehicle, a bank angle of the aerial vehicle, and a turn rate of the aerial vehicle.

17. The system according to claim 9, wherein the instructions, when executed by the at least one processing unit, cause the at least one processing unit to trigger the contingency maneuver by performing at least one action selected from the group consisting of terminating a flight of the aerial vehicle, and actuating a control surface that spoils some of the aerial vehicle's thrust.

18. The system according to claim 9, further comprising a descent stabilizer configured to slow a descent of the aerial vehicle and/or cushion a descent impact of the aerial vehicle, wherein the descent stabilizer comprises at least one selected from the group consisting of a parachute, a foam structure, an air bag, and a spring.

19. An aerial environment, comprising:
the system according to claim 9; and
a remotely-positioned ground control station, wherein the ground control station is configured to transmit user command signals from an operator at the ground control station to the aerial vehicle, wherein the instructions, when executed by the at least one processing unit, cause the at least one processing unit to:
communicate the deviating condition to the ground control station;
trigger the contingency maneuver after waiting a predetermined period of time for the user command signal generated by the ground control station to move the aerial vehicle sufficiently to remove the deviating condition, and after determining that the deviating condition still exists after the predetermined period of time; and
interrupt any user command signals from the ground control station once the at least one processing unit triggers the contingency maneuver.

20. An aerial environment, comprising:
the system according to claim 9; and
a remotely-positioned ground control station, wherein the ground control station is configured to transmit user command signals from an operator at the ground control station to the aerial vehicle, wherein the instructions, when executed by the at least one processing unit, cause the at least one processing unit to:
communicate the deviating condition to the ground control station;
trigger the contingency maneuver after waiting a predetermined period of time for the user command signal generated by the ground control station to move the aerial vehicle sufficiently to remove the deviating condition, and after determining that the deviating condition still exists after the predetermined period of time; and
attenuate any user command signals from the ground control station once the at least one processing unit triggers the contingency maneuver, and wherein the at least one processing unit is configured to attenuate the user command signals to a varying degree, in proportion to a distance between the aerial vehicle and a respective potential conflict.

* * * * *